United States Patent
Akita et al.

(10) Patent No.: US 10,657,256 B2
(45) Date of Patent: May 19, 2020

(54) INFORMATION PROCESSING SYSTEM CONTROLLING PERFORMANCE OF VIRUS DETECTION PROCESSING AT DEVICES INCLUDED IN THE SYSTEM, AND INFORMATION PROCESSING APPARATUS AND RECORDING MEDIUM

(71) Applicant: KONICA MINOLTA, INC., Chiyoda-ku, Tokyo (JP)

(72) Inventors: Katsuhiko Akita, Amagasaki (JP); Yuji Okamoto, Nishinomiya (JP); Kazumi Sawayanagi, Itami (JP); Masami Yamada, Osaka (JP); Atsushi Tamura, Amagasaki (JP); Yasutaka Ito, Amagasaki (JP); Yoshikazu Ikenoue, Itami (JP)

(73) Assignee: KONICA MINOLTA, INC., Tokyo (JP)

( * ) Notice: Subject to any disclaimer, the term of this patent is extended or adjusted under 35 U.S.C. 154(b) by 235 days.

(21) Appl. No.: 15/728,807

(22) Filed: Oct. 10, 2017

(65) Prior Publication Data
US 2018/0121653 A1 May 3, 2018

(30) Foreign Application Priority Data
Oct. 27, 2016 (JP) .................................. 2016-210432

(51) Int. Cl.
*G06F 21/56* (2013.01)
*G06F 21/55* (2013.01)
(Continued)

(52) U.S. Cl.
CPC .......... *G06F 21/566* (2013.01); *G06F 21/554* (2013.01); *G06F 21/71* (2013.01); *G06F 21/84* (2013.01); *G06F 2221/034* (2013.01)

(58) Field of Classification Search
CPC ...... G06F 21/566; G06F 21/71; G06F 21/554; G06F 21/84; G06F 2221/034; H04L 12/40123; H04N 2201/0094
See application file for complete search history.

(56) References Cited

U.S. PATENT DOCUMENTS 5,918,008 A * 6/1999 Togawa ................ G06F 21/567
714/38.1
6,728,886 B1 * 4/2004 Ji .......................... G06F 21/566
714/26
(Continued)

FOREIGN PATENT DOCUMENTS

JP 11327897 A 11/1999
JP 2005229611 A * 8/2005
(Continued)

*Primary Examiner* — J. Brant Murphy
(74) *Attorney, Agent, or Firm* — Holtz, Holtz & Volek PC

(57) ABSTRACT

One information processing apparatus among a plurality of information processing apparatuses performs virus detection processing for detecting a computer virus. When a computer virus has been detected from the one information processing apparatus by the virus detection processing, the one information processing apparatus transmits an execution request to perform the virus detection processing to another information processing apparatus different from the one information processing apparatus among the plurality of information processing apparatuses.

24 Claims, 17 Drawing Sheets

(51) Int. Cl.
*G06F 21/71* (2013.01)
*G06F 21/84* (2013.01)

(56) References Cited

U.S. PATENT DOCUMENTS

| | | | | |
|---|---|---|---|---|
| 8,312,660 B1* | 11/2012 | Fujisaki | | F41A 17/08 |
| | | | | 42/70.01 |
| 8,639,214 B1* | 1/2014 | Fujisaki | | G06Q 20/32 |
| | | | | 379/88.03 |
| 9,516,057 B2* | 12/2016 | Aziz | | H04L 63/1491 |
| 2004/0169881 A1* | 9/2004 | Sato | | H04N 1/00721 |
| | | | | 358/1.15 |
| 2005/0050338 A1* | 3/2005 | Liang | | G06F 21/56 |
| | | | | 713/188 |
| 2005/0177748 A1* | 8/2005 | Katano | | G06F 21/56 |
| | | | | 726/5 |
| 2008/0040803 A1* | 2/2008 | Ehara | | G06F 21/56 |
| | | | | 726/24 |
| 2009/0070879 A1* | 3/2009 | Saika | | G06F 21/566 |
| | | | | 726/24 |
| 2011/0016529 A1* | 1/2011 | Kakie | | G06F 21/566 |
| | | | | 726/24 |
| 2011/0032567 A1* | 2/2011 | Ishida | | G06F 21/56 |
| | | | | 358/1.15 |
| 2011/0067100 A1* | 3/2011 | Fukuoh | | G03G 15/55 |
| | | | | 726/21 |
| 2013/0061325 A1* | 3/2013 | Singh | | H04L 63/145 |
| | | | | 726/24 |
| 2016/0117497 A1* | 4/2016 | Saxena | | G06F 21/566 |
| | | | | 726/23 |
| 2016/0301703 A1* | 10/2016 | Aziz | | H04L 63/145 |
| 2016/0328562 A1* | 11/2016 | Saxena | | G06F 21/56 |

FOREIGN PATENT DOCUMENTS

| | | |
|---|---|---|
| JP | 2005229611 A | 8/2005 |
| JP | 2007206750 A | 8/2007 |
| JP | 4539212 B2 * | 9/2010 |

* cited by examiner

Fig.3
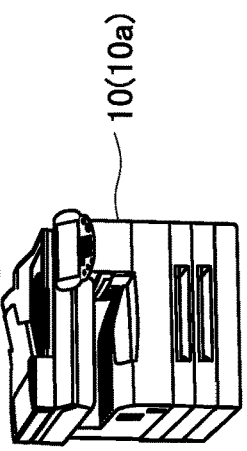
10(10a)
(1) VIRUS DETECTED
(2) REQUEST TO PERFORM VIRUS DETECTION PROCESSING
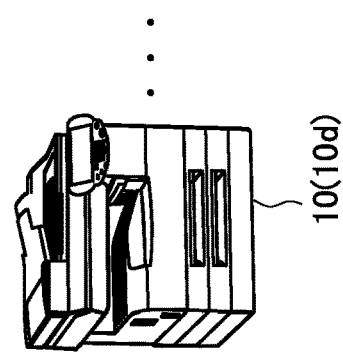
10(10d)
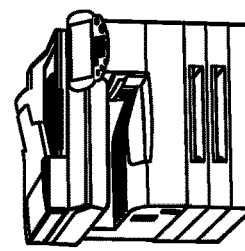
10(10c)
(3) VIRUS DETECTION PROCESSING
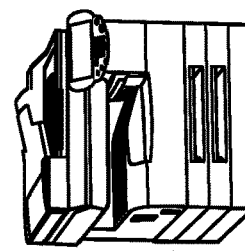
10(10b)
(3) VIRUS DETECTION PROCESSING

| VIRUS ID | VIRUS TYPE | DETECTED APPARATUS | DETECTED DIRECTORY |
|---|---|---|---|
| V01 | A | MFP10a | /user/local |

| APPARATUS | IP ADDRESS |
|---|---|
| MFP10b | 10.0.0.1 |
| MFP10c | 10.0.0.2 |

<EXECUTION HISTORY OF ANTIVIRUS PROCESSING FOR MFP 10a>

| START TIME OF ANTIVIRUS PROCESSING | TIME OF COMPLETION OF ANTIVIRUS PROCESSING | TIME OF DETECTION OF VIRUS |
|---|---|---|
| 2016/7/5 19:00 | 2016/7/5 19:10 | — |
| 2016/7/6 19:00 | — | 2016/7/6 19:05 |

PRESUMED INFECTION PERIOD

Fig.10

| CONNECTION DESTINATION APPARATUS | TIME OF CONNECTION |
|---|---|
| MFP10b | 2016/7/5 18:30 |
| MFP10d | 2016/7/6 17:00 |

← SUSPECTED INFECTED APPARATUS

Fig.13

| USED FUNCTION | TIME OF USE |
|---|---|
| WEB BROWSER | 2016/7/5 18:30 |
| BOX STORAGE | 2016/7/6 17:00 | ← SUSPECTED CAUSE-OF-INFECTION FUNCTION

Fig.14

| MFP | PRIORITY |
|---|---|
| MFP10b | HIGH |
| MFP10c | LOW |
| MFP10d | LOW |

| MFP | START TIME |
|---|---|
| 10b | 2016/7/6 19:10 |
| 10c | 2016/7/6 19:20 |
| 10d | 2016/7/6 19:30 |

| | | |
|---|---|---|
| ANTIVIRUS PROCESSING STATUS | | ☒ |
| MFP10a | SCAN COMPLETED | VIRUS A DETECTED (DISINFECTED) |
| MFP10b | SCANNING | — |
| MFP10c | SCAN COMPLETED | NO VIRUS |
| MFP10d | SCAN COMPLETED | VIRUS A DETECTED (DISINFECTED) |

| | | | |
|---|---|---|---|
| ANTIVIRUS PROCESSING STATUS | | | ☒ |
| MFP10a | SCAN COMPLETED | VIRUS A DETECTED (DISINFECTED) | |
| MFP10b | SCANNING | — | |
| MFP10c | SCAN COMPLETED | NO VIRUS | |
| MFP10d | SCAN COMPLETED | VIRUS A DETECTED (DISINFECTED) | PERMIT |

⋮

510

INFORMATION PROCESSING SYSTEM CONTROLLING PERFORMANCE OF VIRUS DETECTION PROCESSING AT DEVICES INCLUDED IN THE SYSTEM, AND INFORMATION PROCESSING APPARATUS AND RECORDING MEDIUM

Japanese Patent Application No. 2016-210432 filed on Oct. 27, 2016, including description, claims, drawings, and abstract the entire disclosure is incorporated herein by reference in its entirety.

BACKGROUND

Technological Field

The present invention relates to an information processing apparatus and techniques related thereto.

Description of the Related Art

There are techniques for combating computer viruses in an information processing apparatus when any computer virus has been detected in the information processing apparatus (see Japanese Patent Application Laid-Open No. 2005-229611; hereinafter, referred to as "Patent Document 1").

In an information processing system configured by a plurality of information processing apparatuses, frequent data exchange may occur among information processing apparatuses. Thus, if one information processing apparatus is infected with a computer virus in the information processing system, it is possible for other information processing apparatuses to also become infected with the computer virus due to, for example, communication with the infected information processing apparatus.

When a computer virus has been detected from an information processing apparatus in the information processing system, the technique described above in Patent Document 1 merely combats the computer virus in that one information processing apparatus. In other words, even if a computer virus has been detected from one information processing apparatus, the technique described above in Patent Document 1 does nothing with the other information processing apparatuses in the information processing system as a result of the detection of the computer virus.

Thus, if another information processing apparatus is also infected with the computer virus, that information processing apparatus may be damaged by the computer virus. Also, if another information processing apparatus is also infected with the computer virus, yet other information processing apparatuses may also become infected with the computer virus due to, for example, communication with the other infected information processing apparatuses.

Thus, simply combating the computer virus in only the information processing apparatus from which the computer virus has been detected is not enough to properly protect the information processing system configured by a plurality of information processing apparatuses from computer viruses.

SUMMARY

It is an object of the present invention to provide a technique that enables an information processing system configured by a plurality of information processing apparatuses to be protected properly from computer viruses.

According to a first aspect of the present invention, an information processing system includes a plurality of information processing apparatuses. One information processing apparatus among the plurality of information processing apparatuses includes a first hardware processor, and a first transmitter. The first hardware processor causes the one information processing apparatus to perform virus detection processing for detecting a computer virus, and if a computer virus is detected from the one information processing apparatus by the virus detection processing, the first hardware processor causes the first transmitter to transmit an execution request to perform the virus detection processing to another information processing apparatus different from the one information processing apparatus among the plurality of information processing apparatuses.

According to a second aspect of the present invention, an information processing apparatus that is one consistent element of an information processing system configured by a plurality of information processing apparatuses includes a hardware processor and a transmitter. The hardware processor causes the information processing apparatus to perform virus detection processing for detecting a computer virus, and when a computer virus has been detected from the information processing apparatus by the virus detection processing, the hardware processor causes the transmitter to transmit an execution request to perform the virus detection processing to another information processing apparatus different from the information processing apparatus among the plurality of information processing apparatuses.

According to a third aspect of the present invention, a non-transitory computer-readable recording medium that records a program for causing a computer built into an information processing apparatus that is one constituent element of an information processing system configured by a plurality of information processing apparatuses to perform a) causing the information processing apparatus to perform virus detection processing for detecting a computer virus, and b) when a computer virus has been detected from the information processing apparatus by the virus detection processing, transmitting an execution request to perform the virus detection processing to another information processing apparatus different from the information processing apparatus among the plurality of information processing apparatuses.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 3 is a conceptual diagram for describing an outline of operations performed in the information processing system.

FIG. 6 illustrates a virus management table.

FIG. 7 illustrates an apparatus management table.

FIG. 9 illustrates execution history information regarding antivirus processing performed by the request source apparatus (MFP 10a).

FIG. 10 illustrates communication history information regarding the request source apparatus (MFP 10a).

FIG. 13 illustrates used function information regarding the request source apparatus (MFP 10a).

FIG. 14 illustrates the priority of each MFP 10.

FIG. 15 illustrates the start time of a virus scan performed by each MFP 10.

FIG. 16 illustrates an antivirus processing status screen.

FIG. 17 illustrates another antivirus processing status screen.

DETAILED DESCRIPTION OF EMBODIMENTS

Hereinafter, one or more embodiments of the present invention will be described with reference to the drawings. However, the scope of the invention is not limited to the disclosed embodiments.

1. First Embodiment 1-1. Overview of Configuration

Figure 1:
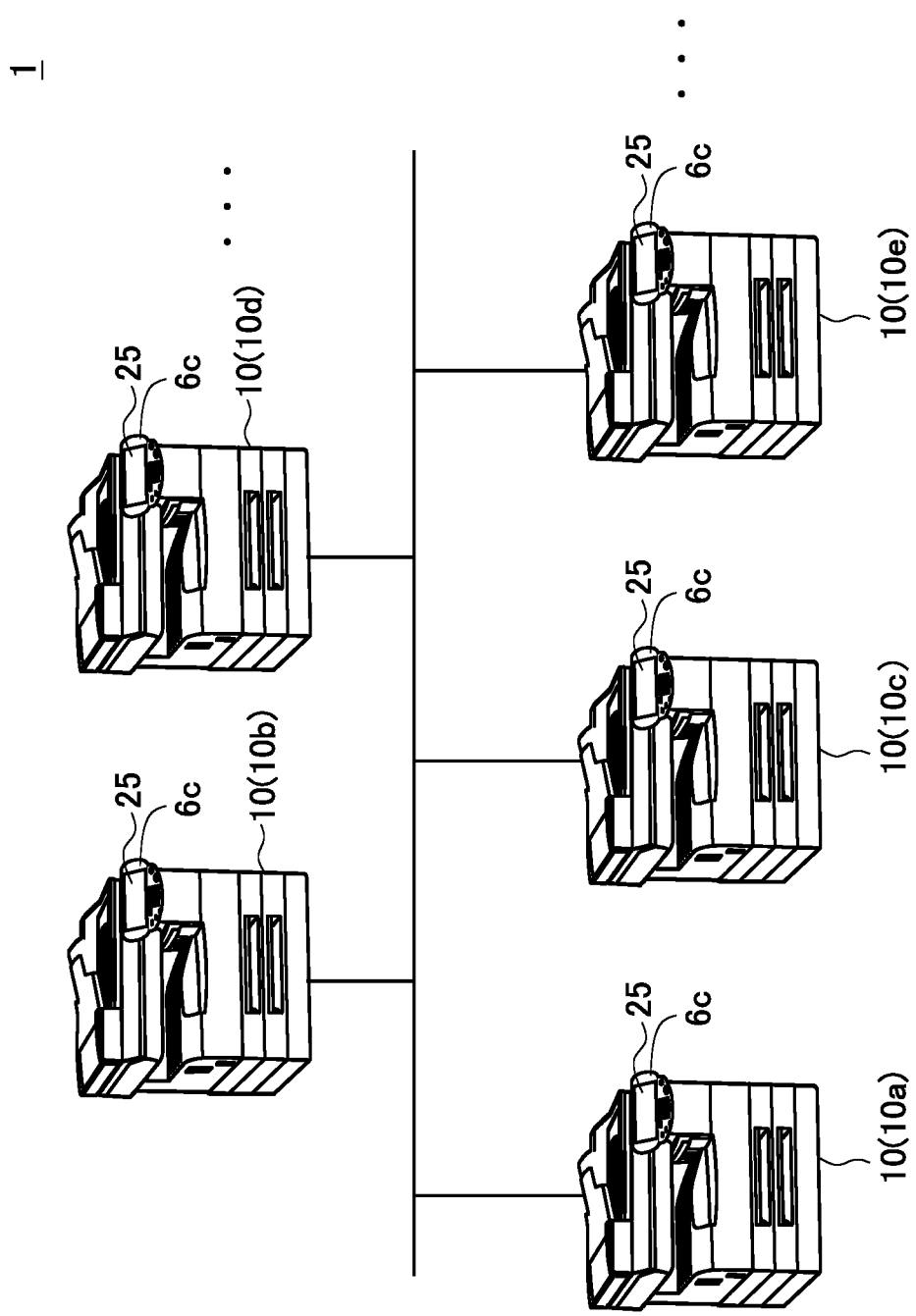
FIG. 1 illustrates an information processing system.

FIG. 1 illustrates an information processing system 1 according to the present invention. The information processing system 1 includes a plurality of information processing apparatuses. In the present example, the information processing system 1 is configured by a plurality of image processing apparatuses 10 (10a, 10b, 10c, and so on) as illustrated in FIG. 1.

Each image processing apparatus 10 has installed software (also referred to as "antivirus software") that enables the image processing apparatus to perform antivirus processing that includes processing for detecting computer viruses (virus detection processing; also referred to as a "virus scan" or "virus check").

More specifically, the antivirus software executes a virus scan in the antivirus processing on the basis of, for example, a virus definition file (file that records, for example, the actions (patterns) of various computer viruses).

If any computer virus has been detected by the virus scan, the antivirus software also executes processing for rendering the detected computer virus harmless (hereinafter, referred to as "rendering harmless processing") in the antivirus processing. The rendering harmless processing includes processing such as processing for combating (removing) computer viruses from files (infected files) that are infected with computer viruses, deletion processing for deleting the infected files, and/or isolation processing for isolating the infected files within a specific area.

When the antivirus processing is started, the antivirus software starts a virus scan of data to be processed (scanned) in the antivirus processing. The virus scan is performed on all data to be processed, and if any computer virus has been detected by the virus scan, the rendering harmless processing is performed on the detected computer virus, and the antivirus processing ends. On the other hand, if no computer viruses have been detected by the virus scan performed on all data to be processed, the antivirus processing is completed along with the completion of the virus scan.

Each image processing apparatus 10 performs a virus scan on a regular basis (so-called regular scan). In the present example, the image processing apparatuses 10 are assumed to perform a regular scan at different times, instead of performing a regular scan in unison at the same time.

According to the present invention, the "infection" with computer viruses includes a latent period from when the computer viruses invade apparatuses until the computer viruses "activate" (e.g., computer viruses destroy data in the apparatuses).

1-2. Configuration of Image Processing Apparatus

Figure 2:
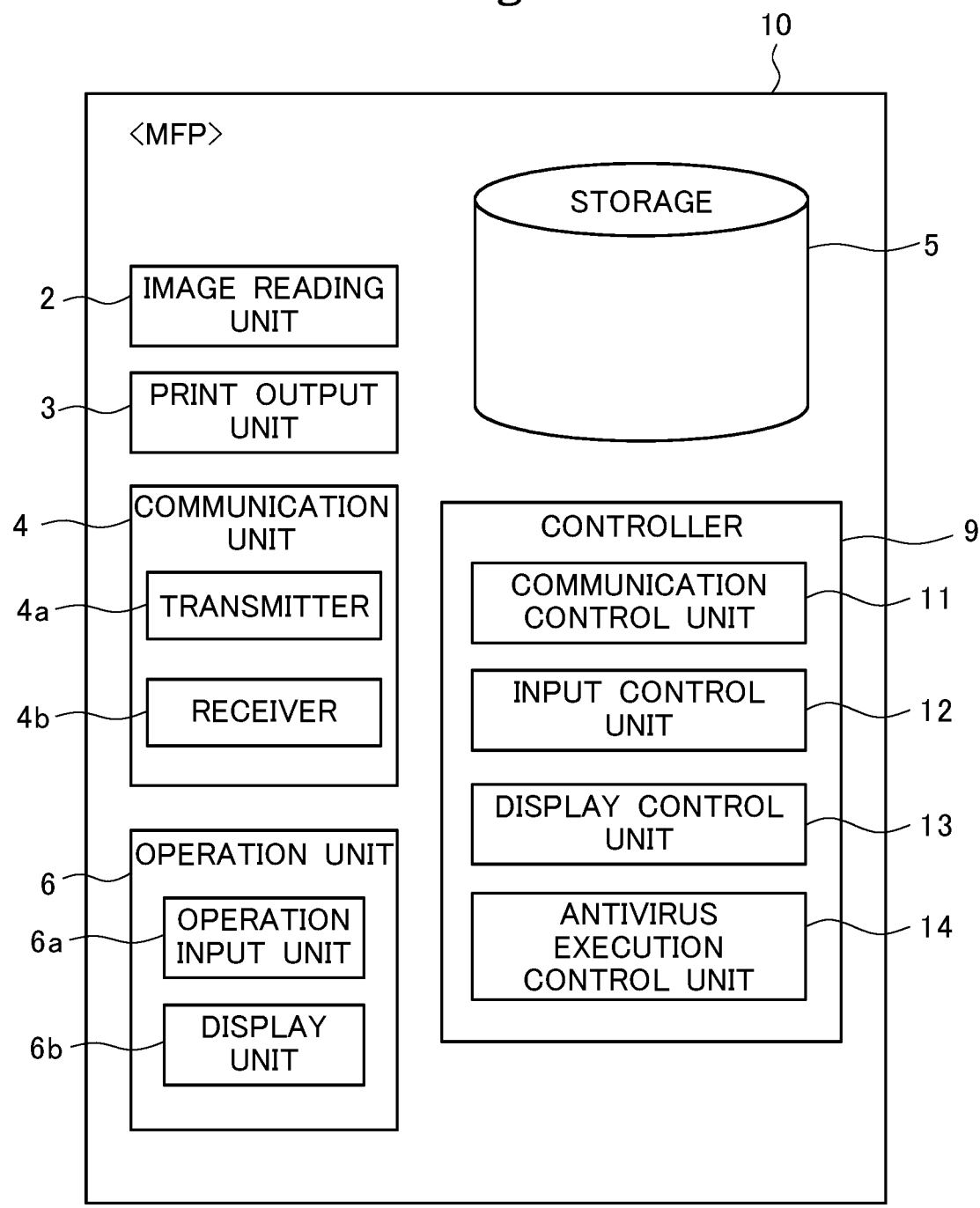
FIG. 2 illustrates functional blocks of an MFP.

FIG. 2 illustrates functional blocks of one of the image processing apparatuses 10 (10a, 10b, 10c, and so on). A Multi-Functional Peripheral (MFP) is illustrated as an example of the image forming apparatuses 10. FIG. 2 illustrates functional blocks of the MFP 10. The MFP 10 is also referred to as an "image forming apparatus."

The MFP 10 is an apparatus (also referred to as a "Multi-Functional Peripheral") having functions such as a scan function, a copy function, a facsimile function, and a box storage function. More specifically, the MFP 10 includes, for example, an image reading unit 2, a print output unit 3, a communication unit 4, a storage 5, an operation unit 6, and a controller 9 as illustrated in the functional block diagram in FIG. 2, and implements various types of functions by operating these units in combination.

The image reading unit 2 is a processing unit that optically reads an original document placed at a predetermined position on the MFP 10 and generates image data (also referred to as a document image) of the original document.

The print output unit 3 is an output unit that prints out an image on various types of media such as paper on the basis of data regarding an object to be printed.

The communication unit 4 is a processing unit that is capable of facsimile communication via a public network or other networks. The communication unit 4 is also capable of network communication via a network. The network communication uses various types of protocols such as Transmission Control Protocol/Internet Protocol (TCP/IP). Using the network communication allows the MFP 10 to exchange various types of information with desired parties (e.g., other MFPs 10). The communication unit 4 includes a transmitter 4a that transmits various types of data, and a receiver 4b that receives various types of data.

The storage 5 is configured by a storage device such as a hard disk drive (HDD).

The operation unit 6 includes an operation input unit 6a that accepts operation input to the MFP 10, and a display unit 6b that displays and outputs various types of information.

The MFP 10 is provided with an operation panel unit 6c of a generally plate-like shape (see FIG. 1). The operation panel unit 6c includes a touch panel 25 (see FIG. 1) on the front side. The touch panel 25 functions not only as part of the operation input unit 6a but also as part of the display unit 6b. The touch panel 25 is configured by embedding various types of sensors or other constituent elements in a liquid crystal display panel and is capable of accepting various types of operation input from an operator while displaying various types of information.

The controller 9 is a control device that is built into the MFP 10 and performs overall control of the MFP 10. The controller 9 is configured as a computer system that includes, for example, a CPU and various types of semiconductor memories such as a RAM and a ROMs. The controller 9 implements various types of processing units by causing the CPU to execute predetermined software programs (hereinafter, also simply referred to as "programs") stored in the ROM (e.g., EEPROM; registered trademark). The programs (to be more specific, a group of program modules) may be recorded in a portable recording medium (or in other words, any of various types of non-transitory computer-readable recording media) such as a USB memory and installed into the MFP 10 via the recording medium. Alternatively, the programs may be downloaded via, for example, a network and installed into the MFP 10.

More specifically, by executing the programs, the controller 9 implements various types of processing units that include a communication control unit 11, an input control unit 12, a display control unit 13, and an antivirus execution control unit 14 as illustrated in FIG. 2.

The communication control unit 11 is a processing unit that controls communication operations with other apparatuses (e.g., other MFPs 10) in cooperation with the communication unit 4 or other constituent elements. The communication control unit 11 includes a transmission control unit that controls operations of transmitting various types of data, and a reception control unit that controls operations of receiving various types of data. For example, when any computer virus has been detected from its own MFP 10, the communication control unit 11 transmits a request (also referred to as a "virus scan request") to perform virus detection processing (virus scan) to other MFPs 10 different from its own MFP 10 among the plurality of MFPs 10. To be more specific, the communication control unit 11 transmits the virus scan request to the request destination apparatuses that receive a virus scan request (in the present example, the remaining MFPs 10 other than its own MFP 10 among the plurality of MFPs 10).

The input control unit 12 is a control unit that controls operations of receiving operation input to the operation input unit 6a (e.g., touch panel 25). For example, the input control unit 12 controls operations of accepting operation input to an operation screen displayed on the touch panel 25.

The display control unit 13 is a processing unit that controls display operations of the display unit 6b (e.g., touch panel 25). The display control unit 13 causes the touch panel 25 to display screens such as an operation screen for operating the MFP 10.

The antivirus execution control unit 14 is a processing unit that controls operations such as performing antivirus processing (a virus scan and rendering harmless processing) on its own MFP 10 in cooperation with the antivirus software. For example, the antivirus execution control unit 14 performs a virus scan of its own MFP 10 on the basis of a virus scan request received from another MFP 10 (MFP 10 from which a computer virus is detected). More specifically, the antivirus execution control unit 14 provides notification of a command to perform a virus scan to the antivirus software in its own MFP 10 upon receiving the virus scan request. Then, the antivirus software performs a virus scan in response to this execution command.

1-3. Operations

According to the present embodiment, when any computer virus has been detected from an MFP 10 (e.g., MFP 10a) among the plurality of MFPs 10, the MFP 10a transmits a virus scan request to the request destination apparatuses (in the present example, MFPs 10 other than the MFP 10a, i.e., MFPs 10b, 10c, 10d, and so on; see FIG. 3). Each request destination apparatus that has received the virus scan request automatically performs a virus scan of its own apparatus on the basis of the virus scan request from the MFP 10a, which is a request source apparatus issuing a virus scan request.

Figure 4:
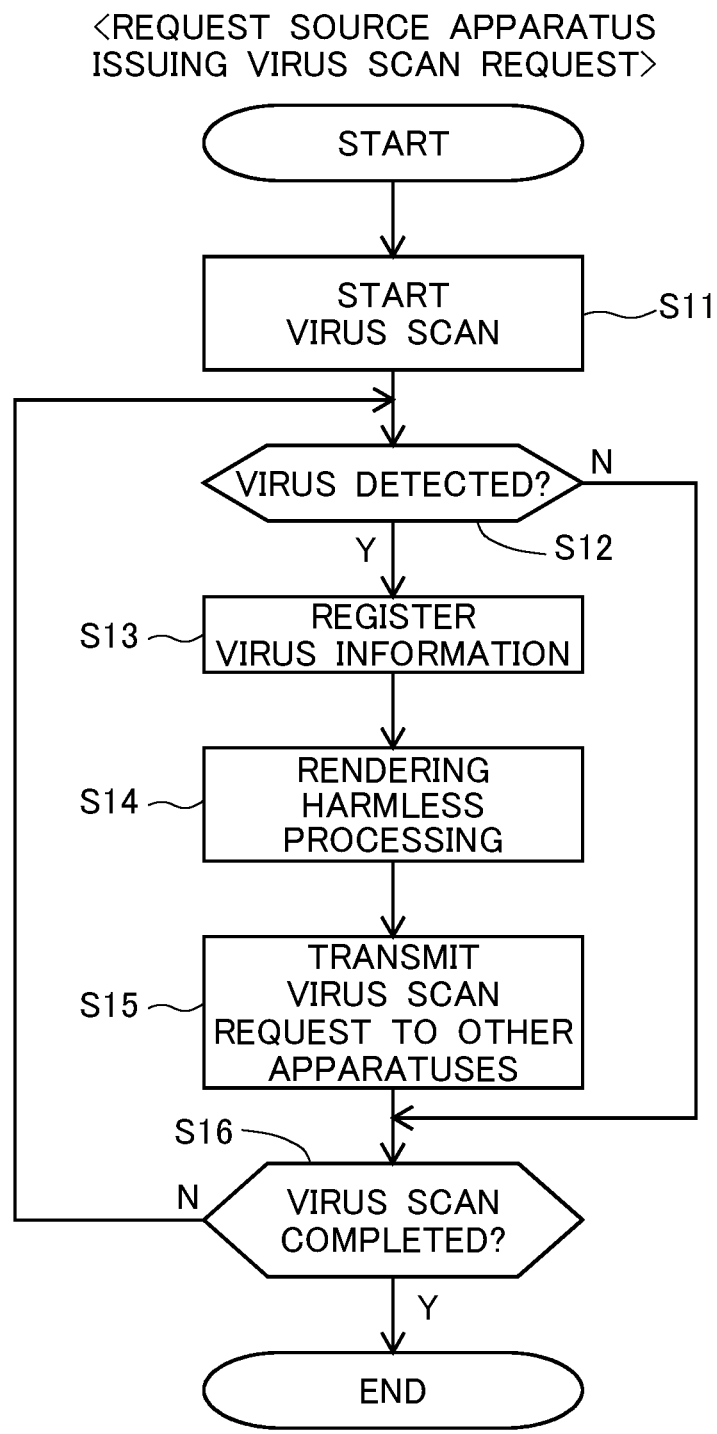
FIG. 4 is a flowchart of operations performed by a request source apparatus that issues a request (virus scan request) to perform virus detection processing.
Figure 5:
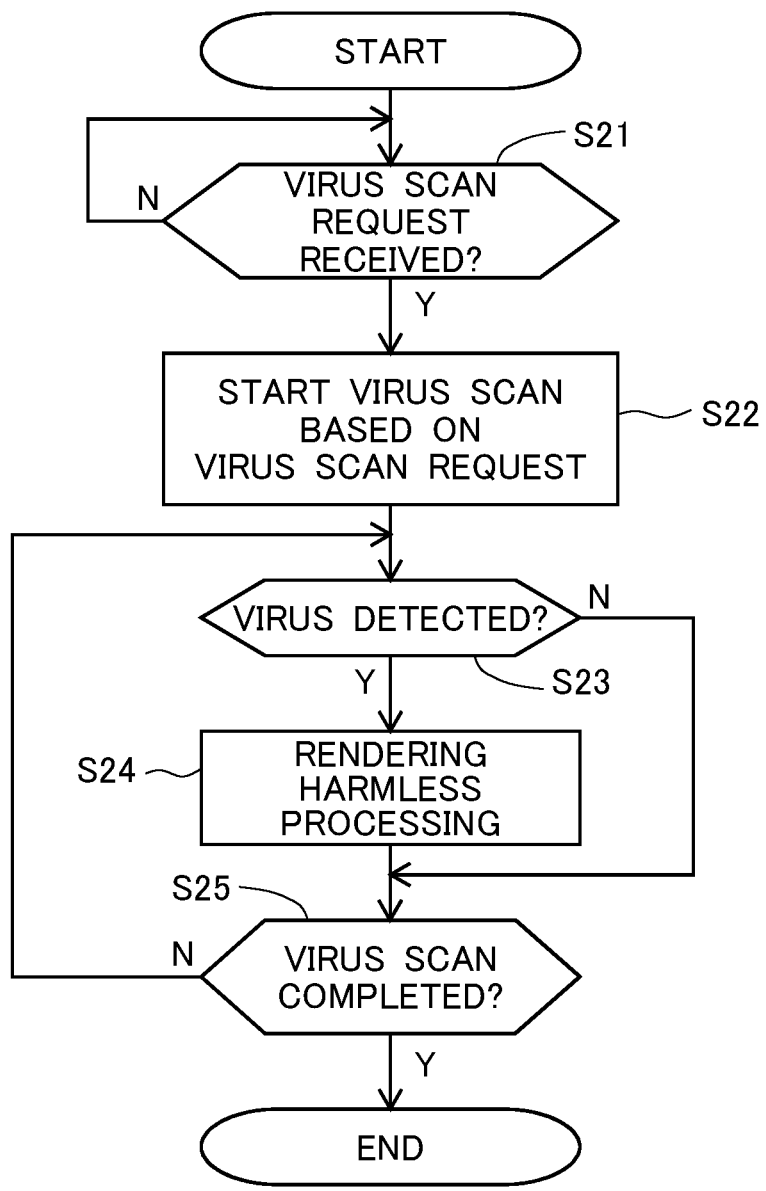
FIG. 5 is a flowchart of operations performed by a request destination apparatus that receives the virus scan request.

FIG. 4 is a flowchart of operations performed by the request source apparatus issuing a virus scan request (in the present example, MFP 10a). FIG. 5 is a flowchart of operations performed by the request destination apparatuses (in the present example, MFPs 10b, 10c, and so on) receiving a virus scan request.

Operations of Request Source Apparatus Issuing Virus Scan Request

First, the operations performed by the request source apparatus issuing a virus scan request (in the present example, MFP 10a) will be described with reference to FIG. 4.

In step S11, the MFP 10a starts antivirus processing and also starts a regular scan (virus scan performed on a regular basis) of data in a predetermined directory (in the present example, all data in the MFP 10a; hereinafter, referred to as "to-be-scanned data"). This virus scan is performed by the antivirus software installed in the MFP 10a.

In step S12, the MFP 10a determines whether any computer virus has been detected by the virus scan of itself. More specifically, it is determined whether a detection result indicating that a computer virus has been detected is acquired from the antivirus software in the MFP 10a.

For example, if the MFP 10a is infected with a computer virus (i.e., a computer virus exists in the MFP 10a), the computer virus is detected by the virus scan of the MFP 10a. Then, it is determined in step S12 that a computer virus has been detected by the virus scan, and the procedure proceeds to step S13. If the MFP 10a is not infected with any computer virus (i.e., no computer viruses exist in the MFP 10a), no computer viruses are detected by the virus scan of the MFP 10a, and the procedure proceeds to step S16, which will be described later.

In step S13, the MFP 10a registers information (virus information) regarding the computer virus detected from itself in a virus management table 300 (see FIG. 6). In the present example, the type (type A) of the detected computer virus, the apparatus (MFP 10a) from which the computer virus is detected, and the directory ("/user/local" in the MFP 10a) from which the computer virus is detected are associated with one another and registered in the virus management table 300.

Then, in step S14, the MFP 10a performs rendering harmless processing on the computer virus detected from itself. For example, the antivirus software in the MFP 10a performs processing for combating the detected computer virus as the rendering harmless processing.

After having performed the rendering harmless processing on the detected computer virus (step S14), the MFP 10a transmits a virus scan request (request to perform virus detection processing) to the request destination apparatuses receiving a virus scan request (step S15).

More specifically, the MFP 10a designates MFPs 10 (in the present example, the remaining MFPs 10 such as MFPs 10b, and 10c other than the MFP 10a among the plurality of MFPs 10) that are pre-registered in an apparatus management table 400 (see FIG. 7) as the request destination apparatuses receiving a virus scan request. Then, the MFP 10*a* transmits the virus scan request in unison to the MFPs 10 (MFPs 10*b*, 10*c*, and so on) designated as the request destination apparatuses receiving a virus scan request (to be more specific, the IP addresses of these MFPs 10). The present invention is, however, not limited to this example, and the virus scan request may be sequentially transmitted to each request destination apparatus.

The virus scan request includes scan-data designation information that designates data to be scanned by the virus scan performed by the request destination apparatuses. In the present example, data stored in the same directory as the directory ("/user/local"; see FIG. 6) of the MFP 10*a* from which the computer virus is detected is designated as the to-be-scanned data. In the information processing system 1, each MFP 10 is assumed to have the same directory structure.

In step S16, the MFP 10*a* determines whether the virus scan of itself is completed.

For example, if the virus scan has not yet been completed for all to-be-scanned data in the MFP 10*a*, the procedure returns to step S12, and the processing from steps S12 to S15 is performed again.

On the other hand, if the virus scan has been completed for all to-be-scanned data in the MFP 10*a*, the antivirus processing of the MFP 10*a* is completed, and the processing of the MFP 10*a* (i.e., flowchart in FIG. 4) ends. When the antivirus processing of the MFP 10*a* has been completed, it is confirmed that the MFP 10*a* is capable of safe communication connection. To be more specific, it is confirmed that the rendering harmless processing has been performed on the computer virus detected from the MFP 10*a* (step S14), and accordingly the MFP 10*a* becomes capable of safe communication connection.

In this way, if any computer virus has been detected from the MFP 10*a*, the MFP 10*a* performs the rendering harmless processing on the detected computer virus and also transmits the virus scan request to the other MFPs 10.

Operations of Request Destination Apparatuses Receiving Virus Scan Request

Next, the operations performed by a plurality of request destination apparatuses receiving a virus scan request (in the present example, MFPs 10*b*, 10*c*, and so on) will be described with reference to FIG. 5. Here, the operations performed by one (e.g., MFP 10*c*) of the request destination apparatuses (MFPs 10*b*,10*c*, and so on) are illustrated by way of example. The other request destination apparatuses (request destination apparatuses other than the MFP 10*c*) also perform operations in the same manner as the MFP 10*c*.

First, in step S21, the one request destination apparatus (in the present example, MFP 10*c*) determines whether a virus scan request has been received. If the MFP 10*c* has received a virus scan request, the procedure proceeds from step S21 to step S22.

In step S22, the request destination apparatus (MFP 10*c*) automatically starts antivirus processing on the basis of the virus scan request received from the request source apparatus issuing a virus scan request (in the present example, MFP 10*a*), and also automatically performs a virus scan of itself (MFP 10*c*).

More specifically, in response to the receipt of the virus scan request, the request destination apparatus (MFP 10*c*) automatically starts a virus scan of the to-be-scanned data (in the present example, data in the directory "/user/local" of the MFP 10*c*) that is designated by the scan-data designation information included in the virus scan request. To be more specific, the antivirus execution control unit 14 of the MFP 10*c* provides notification of a command to perform a virus scan of the to-be-scanned data, to the antivirus software in the MFP 10*c*. In response to this execution command, the antivirus software in the MFP 10*c* starts the virus scan.

In step S23, the request destination apparatus (MFP 10*c*) determines whether any computer virus has been detected by the virus scan (virus scan based on the virus scan request) started by itself (MFP 10*c*). More specifically, it is determined whether a detection result indicating that a computer virus has been detected from the to-be-scanned data designated by the virus scan request has been acquired from the antivirus software in the MFP 10*c*.

For example, if a computer virus has been detected by the virus scan started by the request destination apparatus (MFP 10*c*), the procedure proceeds from step S23 to step S24. If no computer viruses have been detected by the virus scan started by the MFP 10*c*, the procedure proceeds from step S23 to step S25, which will be described later.

In step S24, the request destination apparatus (MFP 10*c*) performs rendering harmless processing on the computer virus detected by the virus scan of itself (MFP 10*c*). More specifically, the antivirus software in the MFP 10*c* performs the rendering harmless processing (e.g., processing for combating the computer virus) on the detected computer virus. Then, the procedure proceeds to step S25.

In step S25, the request destination apparatus (MFP 10*c*) determines whether the virus scan (virus scan of the to-be-scanned data) has been completed.

For example, if the virus scan has not yet been completed for all to-be-scanned data in the MFP 10*c*, the procedure returns to step S23, and the processing in steps S23 and S24 is performed again.

On the other hand, if the virus scan has been completed for all to-be-scanned data in the MFP 10*c*, the antivirus processing of the MFP 10*c* is completed, and the processing of the MFP 10*c* (i.e., flowchart in FIG. 5) ends.

When the antivirus processing of the MFP 10*c* has been completed, it is confirmed that the MFP 10*c* is capable of safe communication connection. More specifically, for example if no computer viruses have been detected from the MFP 10*c*, it is confirmed, from the detection result indicating that no computer viruses exist in the MFP 10*c*, that the MFP 10*c* is capable of safe communication connection. On the other hand, if a computer virus has been detected from the MFP 10*c*, it is confirmed that the rendering harmless processing has been performed on the detected computer virus, and accordingly the MFP 10*c* becomes capable of safe communication connection.

As described above, according to the first embodiment, if any computer virus has been detected from an MFP 10 (in the present example, MFP 10*a*) in the information processing system 1, a virus scan request is transmitted to the other apparatuses (request destination apparatuses receiving a virus scan request) different from the MFP 10*a*. This configuration allows the information processing system 1 configured by a plurality of MFPs 10 to be properly protected from computer viruses.

In particular, according to the first embodiment, the request destination apparatuses receiving a virus scan request (in the present example, MFPs 10*b*, 10*c*, and so on) automatically perform a virus scan in response to receipt of the virus scan request. In other words, after a computer virus has been detected from an MFP 10 (in the present example, MFP 10*a*), the request destination apparatuses (MFPs 10*b*, 10*c*, and so on other than the MFP 10*a*) relatively early perform a virus scan (without waiting for execution of a regular scan to be performed by the request destination apparatuses). Thus, even if another MFP 10 (e.g., MFP 10*c*) is also infected with the computer virus (i.e., the computer virus also exists in the MFP 10*c*), the MFP 10*c* will early perform the rendering harmless processing on the computer virus. This configuration reduces a situation where yet other MFPs 10 become infected with the computer virus (i.e., computer virus infection expands) due to, for example, communication with the MFP 10*c*. Thus, it is possible to more properly protect the information processing system 1 configured by a plurality of MFPs 10 from computer viruses.

While the first embodiment describes an example in which the MFP 10 (here, MFP 10*a*) from which the computer virus is detected transmits a virus scan request to the MFPs 10 pre-registered in the apparatus management table 400 (FIG. 7), the present invention is not limited to this example. For example, the MFP 10*a* may transmit a request to return apparatus information (e.g., IP address) in unison to apparatuses in the same network and then transmit a virus scan request to MFPs 10 that are identified on the basis of the returned apparatus information.

While the first embodiment describes an example in which data in the same directory as the directory from which the computer virus is detected is designated as data to be scanned by the virus scan performed by the request destination apparatuses, the present invention is not limited to this example. For example, all data in the request destination apparatuses may be designated as data to be scanned by the virus scan.

2. Second Embodiment

A second embodiment is a variation of the first embodiment. The following description focuses mainly on differences from the first embodiment.

According to the second embodiment, the request destination apparatuses receiving a virus scan request perform, in addition to the operation described above in the first embodiment, a virus scan of the virus scan request itself (data constituting the virus scan request).

In the present example, the virus scan request is transmitted from the MFP 10 (e.g., MFP 10*a*) from which the computer virus is detected, to the request destination apparatuses. It is not always safe for the request destination apparatuses (e.g., MFP 10*c*) to read the virus scan request from such an MFP 10*a*. If a computer virus is incorporated in the data constituting the virus scan request (internal data of the virus scan request), the request destination apparatuses (MFP 10*c*) that have read the virus scan request may become infected with the computer virus (i.e., the computer virus may invade the request destination apparatuses).

In consideration of this fact, the request destination apparatuses perform a virus scan of the virus scan request itself (data constituting the virus scan request) according to the second embodiment.

More specifically, the MFP 10*a* (MFP 10 from which the computer virus is detected, i.e., the request source apparatus issuing a virus scan request) transmits a virus scan request to specific communication ports (software ports) of the request destination apparatuses (in the present example, MFPs 10*b*, 10*c*, and so on) (see step S15 in FIG. 4).

To be more specific, each MFP 10 is previously provided with a plurality of communication ports that includes a dedicated port for receiving a virus scan request. The MFP 10*a* (request source apparatus) transmits a virus scan request to this dedicated port previously provided in each request destination apparatus.

Note that processing other than the processing performed in step S15 is performed in the same manner as in the above-described first embodiment.

Figure 8:
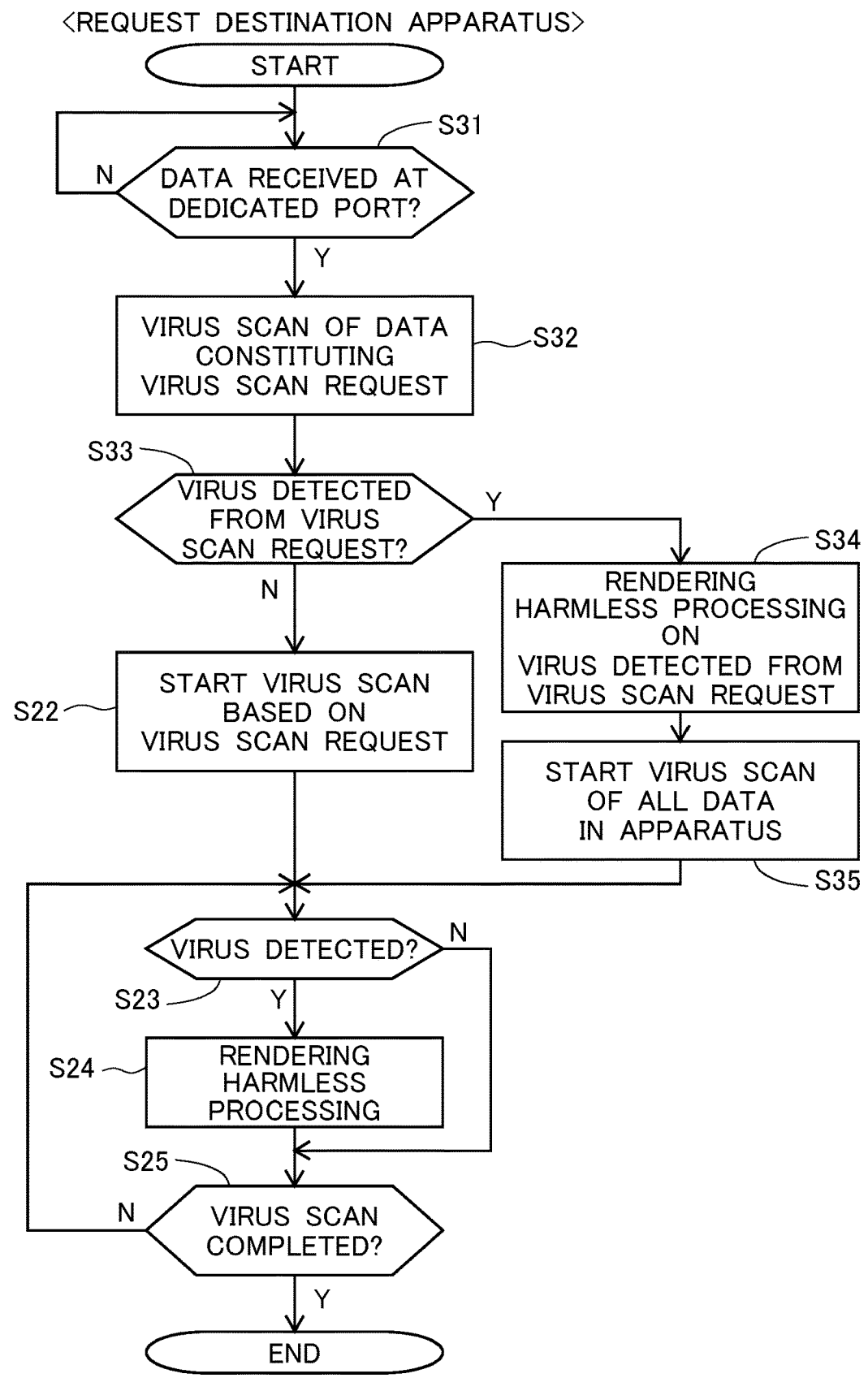
FIG. 8 is a flowchart of operations performed by the request destination apparatus according to a second embodiment.

The request destination apparatuses perform operations according to the flowchart in FIG. 8. FIG. 8 is a flowchart of operations performed by the request destination apparatuses receiving a virus scan request according to the second embodiment. The second embodiment illustrates operations performed by one (e.g., MFP 10*c*) of the plurality of request destination apparatuses (MFPs 10*b*, 10*c*, and so on). The other request destination apparatuses (request destination apparatuses other than the MFP 10*c*) also perform operations in the same manner as the MFP 10*c*.

More specifically, the request destination apparatus (MFP 10*c*) performs a virus scan of data constituting the virus scan request upon receiving the virus scan request (steps S31 and S32).

To be more specific, in step S31, the request destination apparatus (MFP 10*c*) determines whether data has been received at the dedicated port for receiving a virus scan request.

If data has been received at the dedicated port for receiving a virus scan request, the request destination apparatus (MFP 10*c*) determines that the virus scan request has been received, and performs a virus scan of the data (i.e., virus scan request) received at the dedicated port (step S32). More specifically, the antivirus execution control unit 14 of the MFP 10*c* provides notification of a command to perform a virus scan of the data constituting the received virus scan request to the antivirus software, and the antivirus software performs a virus scan of the data constituting the virus scan request in response to this execution command. Then, the procedure proceeds to step S33.

In step S33, the request destination apparatus (MFP 10*c*) determines whether any computer virus has been detected from the data constituting the received virus scan request.

For example, if no computer viruses have been detected from the virus scan request, the procedure proceeds to step S22, and a virus scan based on the virus scan request is performed in the same manner as in the first embodiment. More specifically, the request destination apparatus (MFP 10*c*) starts the antivirus processing and performs a virus scan of to-be-scanned data designated by the scan-data designation information included in the virus scan request. Then, the procedure proceeds to step S23 and onward. The processing performed in step S23 and onward is the same as the processing described in the first embodiment.

On the other hand, if a computer virus has been detected from the data constituting the virus scan request, the procedure proceeds from step S33 to step S34.

In step S34, the request destination apparatus (MFP 10*c*) performs rendering harmless processing (e.g., processing for combating the computer virus) on the computer virus detected from the virus scan request. The request destination apparatus (MFP 10*c*) then starts the antivirus processing and performs a virus scan of all data in itself (MFP 10*c*) (step S35). In other words, if a computer virus has been detected from the data constituting the virus scan request, the request destination apparatus does not read the virus scan request and performs a virus scan of all data in the request destination apparatus. Then, the procedure proceeds to step S23 and onward. The processing performed in step S23 and onward is the same as the processing described in the first embodiment.

In this way, according to the second embodiment, a virus scan of the data constituting the virus scan request is performed upon receipt of the virus scan request. This configuration allows the request destination apparatuses to first ensure the safety of the data itself that constitutes the virus scan request received from the MFP 10 (in the present example, MFP 10a) from which the computer virus is detected and then perform a virus scan based on the virus scan request.

While the second embodiment describes an example in which a virus scan of the data constituting the virus scan request is performed after (or immediately after) the receipt of the virus scan request, the present invention is not limited to this example. For example, a virus scan of the data constituting the virus scan request may be performed during receipt of the virus scan request.

3. Third Embodiment

A third embodiment is a variation of the first embodiment. The following description focuses mainly on differences from the first embodiment.

According to the third embodiment, the request destination apparatuses receiving a virus scan request not only perform the operations according to the first embodiment, but also are forbidden to establish communication connection with an MFP 10 that is suspected of being infected with a computer virus.

In the present example, if the request source apparatus issuing a virus scan request (MFP 10a) has established communication connection with, for example, the MFP 10d between the time when the MFP 10a has been confirmed to be capable of safe communication connection by the previous virus scan and the time when a computer virus has been detected from the MFP 10a, the MFP 10d may be infected with the computer virus. To be more specific, the MFP 10a may have become infected with the computer virus due to the communication connection with the MFP 10d. That is, the MFP 10d may be the cause of infection with the computer virus. As another alternative, if the MFP 10a has already been infected with the computer virus before establishing communication connection with the MFP 10d, the MFP 10d may have become infected with the computer virus due to the communication connection with the MFP 10a. If a request destination apparatus establishes communication connection with such an MFP 10 (MFP 10d that has a relatively high possibility of being infected with a computer virus), the request destination apparatus may also become infected with the computer virus.

In consideration of this fact, according to the third embodiment, the request destination apparatuses receiving a virus scan request are forbidden to establish communication connection with an MFP 10 that has a relatively high possibility of being infected with a computer virus (MFP 10 that is suspected of being infected with a computer virus; also referred to as a "suspected infected apparatus").

In the third embodiment as well, the processing in FIG. 4 and the processing in FIG. 5 are performed in the same manner as in the first embodiment.

However, the virus scan request transmitted from the request source apparatus (e.g., MFP 10a) to the request destination apparatuses includes virus infection information, which will be described later, according to the third embodiment. The request destination apparatuses receiving a virus scan request are forbidden to establish communication connection with a suspected infected apparatus on the basis of the virus infection information included in the virus scan request.

More specifically, each MFP 10 has a record of execution history information regarding antivirus processing performed by itself (to be more specific, antivirus processing performed on all data in the MFP 10).

FIG. 9 illustrates execution history information regarding antivirus processing performed by the MFP 10a. In the present example, the MFP 10a has started antivirus processing (regular scan) on Jul. 5, 2016 at 19:00 and completed the antivirus processing on Jul. 5, 2016 at 19:10. The MFP 10a has started antivirus processing (regular scan) again on Jul. 6, 2016 at 19:00. Then, a computer virus has been detected from the MFP 10a on Jul. 6, 2016 at 19:05.

Each MFP 10 also has a record of communication history information in which an apparatus (connection destination apparatus) with which the MFP 10 has established communication connection is associated with the time (connection time) of the communication connection.

FIG. 10 illustrates communication history information regarding the MFP 10a. In the present example, the communication history information regarding the MFP 10a records that the MFP 10a has established communication connection with the MFP 10b on Jul. 5, 2016 at 18:30 and has established communication connection with the MFP 10d on Jul. 6, 2016 at 17:00.

If a computer virus has been detected from the MFP 10a (step S12 in FIG. 4), the MFP 10a transmits a virus scan request including virus infection information (described later) to the request destination apparatuses (MFPs 10 other than the MFP 10a) after steps S13 and S14 (step S15).

More specifically, the MFP 10a determines that the MFPs 10 that have established communication connection with the MFP 10a (request source apparatus issuing a virus scan request) within a presumed infection period (described next) are suspected infected apparatuses (MFPs 10 suspected of being infected with the computer virus).

The presumed infection period is a period during which the request source apparatus (in the present example, MFP 10a) is presumed to have become infected with the computer virus (period during which the computer virus is presumed to have invaded the request source apparatus; also referred to as a "presumed invasion period"). To be more specific, a period from when the MFP 10a has been confirmed to be capable of safe communication connection by the previous virus scan performed by the request source apparatus (MFP 10a) until a computer virus has been detected from the request source apparatus (MFP 10a) is identified as the presumed infection period. In other words, a period from when the previous antivirus processing performed by the request source apparatus (MFP 10a) has been completed until a computer virus has been detected from the MFP 10a is presumed to be the presumed infection period. In the present example, a period from Jul. 5, 2016 at 19:10 (when the previous antivirus processing has been completed) to Jul. 6, 2016 at 19:05 (when a computer virus has been detected) is identified as the presumed infection period. In short, the MFP 10a is presumed to have become infected with the computer virus during the period from Jul. 5, 2016 at 19:10 to Jul. 6, 2016 at 19:05.

Then, the request source apparatus (MFP 10a) identifies an MFP 10 (in the present example, MFP 10d; see also FIG. 10) that has established communication connection with itself (MFP 10a) within the presumed infection period as a suspected infected apparatus. In other words, if the MFP 10d has established communication connection with the MFP 10a between the time when the previous antivirus processing has been completed and the time when the computer virus has been detected, it is determined that the MFP 10d has a relatively high possibility of being infected with the computer virus, and the MFP 10d is identified as a suspected infected apparatus.

After having identified the suspected infected apparatus, the request source apparatus (MFP 10a) performs control to forbid communication connection between the request destination apparatuses (in the present example, MFPs 10 other than the MFP 10a) and the suspected infected apparatus (in the present example, MFP 10d). More specifically, the request source apparatus (MFP 10a) transmits a virus scan request that includes a connection forbidding command to forbid communication connection between the request destination apparatuses and the suspected infected apparatus (MFP 10d) to the request destination apparatuses (step S15). In the present example, the virus infection information (described next) is included as the connection forbidding command in the virus scan request. The virus infection information includes apparatus information (e.g., IP address) regarding the MFP 10 (in the present example, MFP 10d) identified as the suspected infected apparatus.

Then, upon receiving the virus scan request (step S21), the request destination apparatuses receiving a virus scan request are forbidden to establish communication connection with the suspected infected apparatus on the basis of the connection forbidding command (virus infection information) included in the virus scan request. More specifically, the request destination apparatuses (e.g., MFP 10c) are forbidden to establish communication connection with the MFP 10 (in the present example, MFP 10d) identified on the basis of the apparatus information included in the virus infection information.

Thereafter, the request destination apparatuses automatically perform a virus scan on the basis of the virus scan request (steps S22 to S25). The content of processing performed in steps S22 to S25 is the same as the processing performed in the first embodiment.

In this way, according to the third embodiment, the request destination apparatuses receiving a virus scan request are forbidden to establish communication connection with an MFP 10 that has established communication connection with the request source apparatus within the period (presumed infection period) during which the request source apparatus issuing a virus scan request is presumed to have become infected with the computer virus (i.e., MFP 10 suspected of being infected with the computer virus). This configuration avoids a situation where even the request destination apparatuses become infected with the computer virus as a result of establishing communication connection with the MFP 10 (suspected infected apparatus) that has a relatively high possibility of being infected with the computer virus. Thus, it is possible to reduce the possibility that computer virus infection will expand in the information processing system 1.

While the third embodiment is described as a variation of the first embodiment by way of example, the present invention is not limited to this example, and the idea of the third embodiment may be applied to the second embodiment.

While the third embodiment describes an example in which the connection forbidding command (virus infection information) is included in the virus scan request and transmitted to the request destination apparatuses, the present invention is not limited to this example. For example, the connection forbidding command (virus infection information) may be transmitted as data different from the virus scan request to the request destination apparatuses, instead of being included in the virus scan request. In this case, the virus scan request and the connection forbidding command (virus infection information) may be transmitted at the same time to the request destination apparatuses, or may be transmitted at different times to the request destination apparatuses.

While the third embodiment describes an example in which a single apparatus (e.g., MFP 10d) is identified as a suspected infected apparatus and the request destination apparatuses are forbidden to establish communication connection with this single apparatus identified as the suspected infected apparatus, the present invention is not limited to this example.

For example, a plurality of apparatuses may be identified as suspected infected apparatuses, and the request destination apparatuses may be forbidden to establish communication connection with each of these apparatuses identified as the suspected infected apparatuses.

More specifically, if the request source apparatus issuing a virus scan request (in the present example, MFP 10a) has established communication connection with two MFPs 10 (e.g., MFPs 10d and 10f) within the presumed infection period, these two MFPs 10, namely the MFPs 10d and 10f, are identified as suspected infected apparatuses. Then, the request destination apparatuses are forbidden to establish communication connection with each of the plurality of MFPs 10 (in the present example, two MFPs 10 including the MFPs 10d and 10f) identified as the suspected infected apparatuses.

In this way, a plurality of apparatuses may be identified as suspected infected apparatuses, and the request destination apparatuses may be forbidden to establish communication connection with each of the apparatuses identified as the suspected infected apparatuses.

4. Fourth Embodiment

A fourth embodiment is a variation of the third embodiment. The following description focuses mainly on differences from the third embodiment.

According to the above-described third embodiment, the request destination apparatuses receiving a virus scan request are forbidden to establish communication connection with an MFP 10 (e.g., MFP 10d) that has established communication connection with the request source apparatus issuing a virus scan request (in the present example, MFP 10a) within the presumed infection period. In other words, the request destination apparatuses are forbidden to establish communication connection with an MFP 10 (e.g., MFP 10d) that is suspected of being infected with a computer virus.

According to the fourth embodiment, the request destination apparatuses receiving a virus scan request are forbidden to use a function (e.g., box storage function) that has been used by the request source apparatus (MFP 10a) issuing a virus scan request within the presumed infection period. In other words, the request destination apparatuses are forbidden to use a function (also referred to as a "suspected cause-of-infection function") that is suspected of being a cause of infection with the computer virus.

In the present example, if the MFP 10a has used, for example, the box storage function within the presumed infection period (period from when the previous antivirus processing has been completed until the computer virus has been detected), the MFP 10a may become infected with the computer virus due to having used the box storage function. If the request destination apparatuses use such a function (function that has a relatively high possibility of being a cause of infection with the computer virus), they may also become infected with a computer virus (in particular, the same computer virus as the computer virus infecting the MFP 10*a*).

In consideration of this fact, according to the fourth embodiment, the request destination apparatuses receiving a virus scan request are forbidden to use a function that has a relatively high possibility of being a cause of infection with the computer virus (function suspected of being a cause of infection with the computer virus; also referred to as a "suspected cause-of-infection function").

More specifically, each MFP 10 has a record of information (used function information) regarding functions used by the MFP 10.

FIG. 13 illustrates used function information for the MFP 10*a*. In the present example, the used function information records that the MFP 10*a* has used a web browser function on Jul. 5, 2016 at 18:30 and has used a box storage function on Jul. 6, 2016 at 17:00.

The web browser function is a function of the MFP 10 exchanging various types of data through communication with a web server. The box storage function is a function of storing various types of data in the MFP 10. In the present example, by using the box storage function, each MFP 10 is capable of not only storing data and the like read by itself in itself, but also storing data received from other MFPs 10 in itself through communication with the other MFPs 10 different from itself.

Then, the request source apparatus issuing a virus scan request (in the present example, MFP 10*a*) identifies a function that is used by the request source apparatus within the presumed infection period (in particular, function that involves communication connection with other apparatuses; a suspected cause-of-infection function) on the basis of the used function information. In the present example, the request source apparatus (MFP 10*a*) identifies the box storage function that is used within the presumed infection period (period from Jul. 5, 2016 at 19:10 when the previous antivirus processing has been completed to Jul. 6, 2016 at 19:05 when the computer virus has been detected) as a suspected cause-of-infection function. In short, the MFP 10*a* is presumed to have become infected with a computer virus due to having used the box storage function within the period from Jul. 5, 2016 at 19:10 to Jul. 6, 2016 at 19:05.

After having identified the suspected cause-of-infection function, the request source apparatus (MFP 10*a*) performs control so as to forbid the request destination apparatuses (in the present example, MFPs 10 other than the MFP 10*a*) to use the suspected cause-of-infection function. More specifically, the request source apparatus (MFP 10*a*) transmits a virus scan request that includes a use forbidden command to forbid the request destination apparatuses to use the suspected cause-of-infection function, to the request destination apparatuses (step S15 in FIG. 4). In the present example, the virus infection information is included as the use forbidden command in the virus scan request. The virus infection information as used herein includes information regarding a function that is identified as the suspected cause-of-infection function (in the present example, box storage function).

Upon receiving the virus scan request, the request destination apparatuses (e.g., MFP 10*c*) receiving a virus scan request are forbidden to use the suspected cause-of-infection function on the basis of the use forbidden command (virus infection information) included in the virus scan request. More specifically, the request destination apparatuses are forbidden to use the function (suspected cause-of-infection function; in the present example, the box storage function) included in the virus infection information. Note that the request destination apparatuses are not forbidden to use functions other than the suspected cause-of-infection function (box storage function), such as a copy function, a scan function, and a web browser function.

Then, the request destination apparatuses perform a virus scan on the basis of the virus scan request (steps S22 to S25). The content of processing performed in steps S22 to S25 is the same as the content of processing performed in the first embodiment.

In this way, according to the fourth embodiment, the request destination apparatuses receiving a virus scan request are forbidden to use the function (function suspected of being a cause of infection with the computer virus) that has been used by the request source apparatus issuing a virus scan request (in the present example, MFP 10*a*) within the presumed infection period. This avoids a situation where the request destination apparatuses will also become infected with computer viruses (in particular, the same computer virus as the computer virus infecting the request source apparatus) due to having used a function that has a relatively high possibility of being a cause of infection with the computer virus. Thus, it is possible to reduce the possibility that computer virus infection will expand in the information processing system 1.

While the fourth embodiment describes an example in which the use forbidden command (virus infection information) is included in the virus scan request and transmitted to the request destination apparatuses, the present invention is not limited to this example. For example, the use forbidden command (virus infection information) may be transmitted as separate data different from the virus scan request to the request destination apparatuses, instead of being included in the virus scan request. In this case, the virus scan request and the use forbidden command (virus infection information) may be transmitted at the same time to the request destination apparatuses, or may be transmitted at different times to the request destination apparatuses.

While the fourth embodiment describes an example in which a single function (e.g., box storage function) is identified as a suspected cause-of-infection function and the request destination apparatuses are forbidden to use this single function identified as the suspected cause-of-infection function, the present invention is not limited to this example.

For example, a plurality of functions may be identified as suspected cause-of-infection functions, and the request destination apparatuses may be forbidden to use each of these functions identified as the suspected cause-of-infection functions.

More specifically, when the request source apparatus issuing a virus scan request (in the present example, MFP 10*a*) has used the box storage function and the copy function within the presumed infection period, these two functions, namely the box storage function and the copy function, are identified as suspected cause-of-infection functions. Then, the request destination apparatuses are forbidden to use each of the functions identified as the suspected cause-of-infection functions (in the present example, the two functions, namely the box storage function and the copy function).

In this way, a plurality of functions may be identified as suspected cause-of-infection functions, and the request destination apparatuses may be forbidden to use each of the functions identified as the suspected cause-of-infection functions.

As another alternative, the request destination apparatuses may be forbidden to use at least one of the plurality of functions identified as suspected cause-of-infection functions.

More specifically, when the request source apparatus issuing a virus scan request (in the present example, MFP 10a) has used the box storage function and the copy function within the presumed infection period, the two functions, namely the box storage function and the copy function, are identified as suspected cause-of-infection functions. Then, the request destination apparatuses are forbidden to use only a function that involves communication connection with other apparatuses (in the present example, the box storage function) among the plurality of functions identified as the suspected cause-of-infection functions (in the present example, two functions including the box storage function and the copy function). In other words, the request destination apparatuses are not forbidden to use a function that does not involve communication connection with other apparatuses, even if that function is identified as a suspected cause-of-infection function.

In this way, the request destination apparatuses may be forbidden to use at least one of a plurality of functions identified as suspected cause-of-infection functions.

5. Fifth Embodiment

A fifth embodiment is a variation of the first embodiment. The following description focuses mainly on differences from the first embodiment.

According to the above-described first embodiment, the request destination apparatuses receiving a virus scan request performs (or immediately performs) a virus scan in response to receipt of a virus scan request.

According to the fifth embodiment, the virus scan request includes time designation information that designates a point in time (start time) in which the virus scan is started, and the request destination apparatuses receiving a virus scan request perform a virus scan in response to arrival of the time designated by the time designation information.

During a virus scan, the processing speed of the MFPs 10 performing a job such as a print job decreases due to increased processing load. As a result, the operability of the MFPs 10 for users is deteriorated, e.g., the speed of reaction of the MFPs 10 to user operations is reduced. Thus, if all request destination apparatuses start a virus scan in unison in response to receipt of a virus scan request, the processing load on all request destination apparatuses will increase, and accordingly the user will feel poor operability when using any of the request destination apparatuses.

In consideration of this fact, according to the fifth embodiment, the request source apparatus designates the start time of the virus scan for each request destination apparatus receiving a virus scan request, and each request destination apparatus starts a virus scan in response to arrival of the designated start time.

More specifically, the request source apparatus issuing a virus scan request (e.g., MFP 10a) transmits a virus scan request that includes the time designation information for designating the start time of the virus scan performed by each request destination apparatus, to the request destination apparatuses (see step S15 in FIG. 4). Note that the MFP 10a performs processing other than the processing performed in step S15 in the same manner as in the first embodiment.

To be more specific, the request source apparatus (MFP 10a) designates the start time of the virus scan for each request destination apparatus in accordance with a predetermined order of priority of a plurality of MFPs 10.

FIG. 14 illustrates the priority of each MFP 10 (priority as to the virus scan). In the present example, an MFP 10 that has relatively more opportunities to establish communication connection with other MFPs 10 is set higher in priority than an MFP 10 that has relatively few opportunities to establish communication connection with other MFPs 10. For example, when the MFP 10b has a relatively large-capacity storage 5 and has relatively more opportunities to receive a request to use the box storage function from other MFPs 10 (request to store data in the storage 5 of the MFP 10b), the MFP 10b is set higher in priority than the other MFPs 10 (MFPs 10 other than the MFP 10b). On the contrary, an MFP 10 that has relatively few opportunities to establish communication connection with other MFPs 10 is set low in priority.

The request source apparatus (MFP 10a) designates the start time of the virus scan for each request destination apparatus on the basis of the priority set for each MFP 10 (priority as to a virus scan).

FIG. 15 illustrates the start time of the virus scan for each request destination apparatus. As illustrated in FIG. 15, the start time of the virus scan for the MFP 10 (in the present example, MFP 10b) that is highest in priority is designated such that the MFP 10b will start a virus scan at the very beginning. The start times of the virus scans for MFPs 10 (in the present example, MFPs 10c, 10d, and so on) that are lower in priority than the MFP 10b are designated such that these MFPs 10 start a virus scan after the start time of the virus scan for the MFP 10b. In the present example, a different start time is designated for each request destination apparatus. The present invention is, however, not limited to this example, and the same start time may be designated for some of the request destination apparatuses (e.g., request destination apparatuses having the same priority).

Then, the request source apparatus (MFP 10a) transmits a virus scan request that includes the time designation information for designating the start time of the virus scan for each request destination apparatus, to the request destination apparatuses (step S15).

Upon receipt of the virus scan request, the request destination apparatuses receiving a virus scan request automatically perform a virus scan in response to arrival of the time designated by the time designation information included in the virus scan request. For example, the MFP 10b automatically starts a virus scan in response to arrival of the start time (Jul. 6, 2016 at 19:10) designated for the MFP 10b by the time designation information. Similarly, the other MFPs 10 also start a virus scan in response to arrival of the time designated for each MFP 10 by the time designation information.

In this way, according to the fifth embodiment, the virus scan request includes the time designation information for designating the start time of the virus scan, and the request destination apparatuses receiving a virus scan request performs a virus scan in response to arrival of the time designated by the time designation information. This configuration prevents all request destination apparatuses to start a virus scan in unison and prevents the processing load on all request destination apparatuses to increase at the same time. Thus, it is possible to properly protect the information processing system 1 from computer viruses in consideration of the operability for users.

While the fifth embodiment is described as a variation of the first embodiment by way of example, the present invention is not limited to this example, and the idea of the fifth embodiment may be applied to other embodiments.

While the fifth embodiment describes an example in which the start time of the virus scan for each request destination apparatus is designated on the basis of the priority of each MFP 10 (priority as to the virus scan), the present invention is not limited to this example. For example, the start time of the virus scan for each request destination apparatus may be designated irrespective of the priority (e.g., in accordance with the order of registration in the apparatus management table 400; see FIG. 7).

6. Sixth Embodiment

A sixth embodiment is a variation of the first embodiment. The following description focuses mainly on differences from the first embodiment.

According to the sixth embodiment, each MFP 10 shares a processing result of antivirus processing, in addition to performing the operations described in the above embodiments.

More specifically, after having completed the antivirus processing, each request destination apparatus receiving a virus scan request (e.g., MFP 10c) transmits a processing result of the antivirus processing (report of completion) to the request source apparatus (e.g., MFP 10a) and to the remaining request destination apparatuses (MFPs 10b, 10d, and so on).

To be more specific, after having completed a virus scan (step S25 in FIG. 5), the request destination apparatus (MFP 10c) transmits a processing result of the virus scan as a processing result of the antivirus processing to the request source apparatus and the remaining request destination apparatuses. The request destination apparatus (MFP 10c) also transmits a security check report indicating that this apparatus is confirmed to be capable of safe communication connection, as a processing result of the antivirus processing, to the request source apparatus and the remaining request destination apparatuses.

For example, if no computer viruses have been detected as a result of the virus scan (step S23) performed by the request destination apparatus (MFP 10c), the MFP 10c transmits a processing result indicating that no computer viruses have been detected from the MFP 10c to the request source apparatus and the remaining request destination apparatuses. If no computer viruses have been detected from the MFP 10c, the MFP 10c also transmits a virus nonexistence report indicating that no computer viruses exist in the MFP 10c (there is no possibility that communication destination apparatuses will become infected with computer viruses due to communication connection with the MFP 10c) as the security check report to the request source apparatus and the remaining request destination apparatuses.

On the other hand, if a computer virus has been detected as a result of the virus scan (step S23) performed by the request destination apparatus (MFP 10c), the MFP 10c transmits a processing result indicating that a computer virus has been detected from the MFP 10c, to the request source apparatus and the remaining request destination apparatuses. If a computer virus has been detected from the MFP 10c, the MFP 10c also transmits a security check report to the request source apparatus and the remaining request destination apparatuses, on condition that the rendering harmless processing has been performed on the computer virus detected from the MFP 10c (step S24). In other words, a virus disinfection report indicating that there is no possibility that communication destination apparatuses will become infected with computer viruses due to communication connection with the MFP 10c is transmitted as the security check report to the request source apparatus and the remaining request destination apparatuses.

The request source apparatus issuing a virus scan request (MFP 10a) also transmits a processing result of the antivirus processing (report of completion) to each request destination apparatus (in the present example, MFPs 10 other than the MFP 10a) after having completed the antivirus processing.

To be more specific, after having completed a virus scan (step S16 in FIG. 4), the request source apparatus (MFP 10a) transmits a processing result of the virus scan as a processing result of the antivirus processing to each request destination apparatus. In the present example, a computer virus has been detected by the virus scan performed by the MFP 10a, as described above. Thus, after having completed the virus scan, the MFP 10a transmits a processing result indicating that a computer virus has been detected from the MFP 10a to each request destination apparatus (each MFP 10). The MFP 10a also transmits a security check report indicating that the MFP 10a is confirmed to be capable of safe communication connection as a processing result of the antivirus processing to each request destination apparatus, on condition that the rendering harmless processing has been performed on the computer virus detected from the MFP 10a (step S14). In other words, a virus disinfection report indicating that there is no possibility that communication destination apparatuses will become infected with computer viruses due to communication connection with the MFP 10a is transmitted as the security check report to each request destination apparatus.

In this way, each MFP 10 transmits the processing result of the virus scan performed by itself and the security check report to the MFPs 10 other than itself as a processing result of the antivirus processing. Then, each MFP 10 receives processing results of the antivirus processing performed by the MFPs 10 other than itself (processing results of virus scans and security check reports). That is, each MFP 10 shares the processing results of antivirus processing performed by the MFPs 10 other than itself.

Each MFP 10 uses the processing results of antivirus processing performed by the MFPs 10 other than itself, as follows.

More specifically, each MFP 10 displays the processing results of antivirus processing performed by the MFPs 10 other than itself (processing results of virus scans and security check reports) on the touch panel 25 upon receiving the processing results. In other words, each MFP 10 displays processing statuses of antivirus processing performed by the plurality of MFPs 10 constituting the information processing system 1.

FIG. 16 illustrates an antivirus processing status screen 500(501) that displays the processing statuses of antivirus processing performed by the plurality of MFPs 10.

For example, a request destination apparatus (e.g., MFP 10c) displays receipt of a virus scan request on the antivirus processing status screen 501 upon receiving a virus scan request from the request source apparatus (in the present example, MFP 10a). Then, the MFP 10c displays the processing results of antivirus processing performed by MFPs 10 other than itself (processing results of virus scans and security check reports) on the antivirus processing status screen 501 upon receiving these processing results.

For example, the MFP 10c displays the processing result of antivirus processing performed by the MFP 10d on the antivirus processing status screen 501 upon receiving this processing result. More specifically, the processing result of the virus scan performed by the MFP 10d (in the present example, processing result indicating that a computer virus has been detected from the MFP 10d) is displayed on the antivirus processing status screen 501. In addition, a message that is based on the security check report received from the MFP 10d is also displayed on the antivirus processing status screen 501. To be more specific, a message based on the security check report from the MFP 10d and indicating that the MFP 10d is confirmed to be capable of safe communication connection (i.e., rendering harmless processing has been performed on the computer virus detected from the MFP 10d) is displayed on the antivirus processing status screen 501.

Note that the processing result of antivirus processing is not received from an MFP 10 that has not yet completed the antivirus processing, and the antivirus processing status screen 501 (see FIG. 16) displays that such an MFP 10 (in the present example, MFP 10b) is currently performing the antivirus processing (virus scan).

In this way, each MFP 10 displays the processing status (processing result) of antivirus processing performed by each MFP 10.

This enables a manager of each MFP 10 (e.g., an administrator of the information processing system 1) to grasp information regarding the other MFPs 10 such as computer virus infection conditions and progress statuses of antivirus processing (virus scans).

While the sixth embodiment is described as a variation of the first embodiment by way of example, the present invention is not limited to this example, and the idea of the sixth embodiment may be applied to other embodiments.

While the sixth embodiment describes an example in which each MFP 10 transmits and receives both of the processing result of a virus scan and the security check report as the processing result of antivirus processing, the present invention is not limited to this example. For example, each MFP 10 may transmit and receive either the processing result of a virus scan or the security check report as the processing result of antivirus processing.

More specifically, each MFP 10 may transmit and receive only the security check report as the processing result of antivirus processing. Then, upon receiving a security check report, each MFP 10 may display a message saying that the MFP 10 from which the security check report has been transmitted is confirmed to be capable of safe communication connection and a message saying that the virus scan is completed, on the antivirus processing status screen 500.

Alternatively, each MFP 10 may transmit and receive only the processing result of a virus scan as the processing result of antivirus processing. Then, upon receiving the processing result of a virus scan, each MFP 10 may display whether a computer virus has been detected from the MFP 10 from which the processing result has been transmitted, on the antivirus processing status screen 500.

While the sixth embodiment describes an example in which the security check report is used to display the processing result of antivirus processing performed by each MFP 10, the present invention is not limited to this example, and the security check report may be used in the following instance.

For example, when a request destination apparatus has received an access request from an apparatus other than itself during execution of a virus scan, the security check report may be used to introduce information regarding an alternate apparatus that serves as a substrate for the request destination apparatus to the transmission source apparatus that has issued the access request.

More specifically, a request destination apparatus (e.g., MFP 10c) receives the processing result of a virus scan and a security check report (report indicating that an MFP 10 is confirmed to be capable of safe communication connection) from an MFP 10 that has completed antivirus processing. Then, if the request destination apparatus (MFP 10c) has received an access request from an apparatus (e.g., MFP 10e) other than itself among the plurality of MFPs 10 while having not yet completed its virus scan, the MFP 10c identifies an alternate apparatus serving as a substrate for itself. To be specific, the request destination apparatus (MFP 10c) identifies an alternate apparatus that serves as a substrate for the MFP 10c to establish communication connection with the transmission source apparatus (MFP 10e) having issued the access request, on the basis of the security check report received from the other MFPs 10. To be more specific, an MFP 10 (e.g., MFP 10b) that has already completed antivirus processing and that is confirmed to be capable of safe communication connection, among the plurality of MFPs 10, is identified as an alternate apparatus serving as a substrate for the request destination apparatus (MFP 10c) on the basis of the security check report received from the MFP 10b.

Then, the request destination apparatus (MFP 10c) transmits information (alternate apparatus information) regarding the identified alternate apparatus (in the present example, MFP 10b) to the transmission source apparatus (MFP 10e) that has issued the access request. In other words, the apparatus (in the present example, MFP 10c) that has not yet been confirmed to be capable of safe communication connection introduces an MFP 10 (in the present example, MFP 10b) that is confirmed to be capable of safe communication connection, as an alternate apparatus serving as a substitute for itself to the transmission source apparatus (in the present example, MFP 10e) that has issued the access request. Then, the request destination apparatus (MFP 10c) disconnects the communication with the transmission source apparatus (MFP 10e) after having transmitted the alternate apparatus information to the transmission source apparatus (MFP 10e) that has issued the access request.

The transmission source apparatus (MFP 10e) that has issued the access request establishes communication connection with the alternate apparatus (MFP 10b) on the basis of the alternate apparatus information received from the MFP 10c, and transmits an access request to the MFP 10b.

Figure 21:
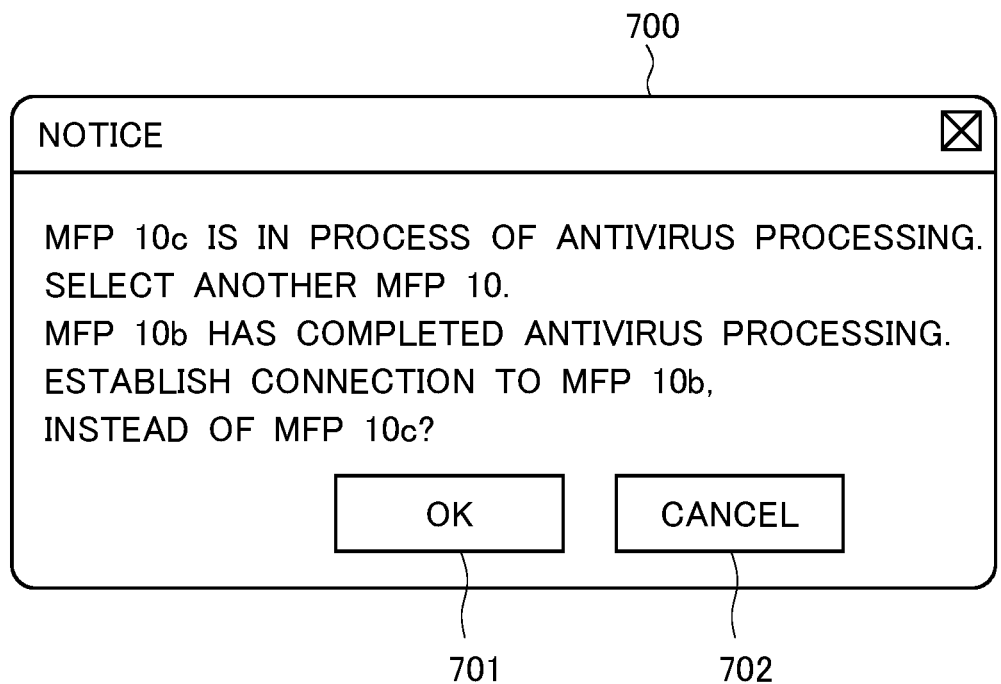
FIG. 21 illustrates a screen for introducing an alternate apparatus.

FIG. 21 illustrates an introduction screen 700 for introducing an alternate apparatus. The introduction screen 700 is displayed on the touch panel 25 of the transmission source apparatus having issued an access request (in the present example, MFP 10e). The introduction screen 700 displays a message that prompts the user to establish communication connection with an alternate apparatus (new transmission destination apparatus that receives an access request; MFP 10b), instead of the MFP 10c (original transmission destination apparatus that receives an access request), as illustrated in FIG. 21.

For example, when the user wants to establish communication connection with the introduced alternate apparatus (MFP 10b), the user presses an OK button 701 on the introduction screen 700. When the OK button 701 is pressed, the transmission source apparatus (MFP 10e) determines the alternate apparatus (MFP 10b) as a new transmission destination apparatus that receives the access request, and transmits the access request to the MFP 10b. If a "CANCEL" button 702 is pressed on the introduction screen 700, for example, the MFP 10e displays a selection screen (not shown) for re-selecting a transmission destination apparatus that receives the access request, and the user re-selects a desired transmission destination apparatus.

In this way, the request destination apparatuses may use the security check reports received from the other MFPs 10 to introduce an MFP 10 that has completed a virus scan to the transmission source apparatus that has issued the access request.

Alternatively, in the above-described third embodiment, the security check reports from the other MFPs 10 may be used to again enable communication connection that the request destination apparatus is forbidden to establish (i.e., communication connection with a suspected infected apparatus).

More specifically, if a request destination apparatus (e.g., MFP 10c) is forbidden to establish communication connection with a suspected infected apparatus (e.g., MFP 10d) and thereafter the MFP 10d has completed antivirus processing and is confirmed to be capable of safe communication connection, communication connection between the MFP 10c and the MFP 10d may be enabled.

To be more specific, after having completed antivirus processing, the suspected infected apparatus (in the present example, MFP 10d) transmits not only the processing result of a virus scan performed by itself but also the security check report to the MFPs 10 other than the MFP 10d (in the present example, MFPs 10a, 10b, 10c, 10e, and so on). In response to receipt of the security check report from the suspected infected apparatus (MFP 10d), a request destination apparatus (MFP 10c) displays a PERMIT button 510 for permitting communication connection with the MFP 10d on an antivirus processing status screen 502 (FIG. 17). If the user (e.g., manager) has pressed the PERMIT button 510, communication connection between the MFPs 10c and 10d is permitted again.

In the present example, when a request destination apparatus (e.g., MFP 10c) has accepted the press of the PERMIT button 510, only the MFP 10c is permitted to establish communication connection with the suspected infected apparatus (in the present example, MFP 10d). The present invention is, however, not limited to this example. For example, when the request destination apparatus (MFP 10c) has accepted the press of the PERMIT button 510, not only the MFP 10c but also the other MFPs 10 (e.g., the request source apparatus and the request destination apparatuses other than the MFP 10c) may also be permitted to establish communication connection with the suspected infected apparatus (MFP 10d).

While in the present example, a request destination apparatus (MFP 10c) is permitted to establish communication connection with the suspected infected apparatus (MFP 10d) in response to pressing of the PERMIT button 510 by the user, the present invention is not limited to this example. For example, the request destination apparatus (MFP 10c) may be automatically permitted to establish communication connection with the suspected infected apparatus (MFP 10d) in response to receipt of a report of completion from the suspected infected apparatus (MFP 10d).

7. Variations

While the above has been a description of embodiments of the present invention, the present invention is not intended to be limited to the examples described above.

Variation on Forbidden Communication Connection with Suspected Infected Apparatus (Third Embodiment)

While the above third embodiment and other embodiments describe an example in which the request destination apparatuses receiving a virus scan request are unconditionally forbidden to establish communication connection with a suspected infected apparatus, the present invention is not limited to this example, and the request destination appara-tuses may be forbidden to establish communication connection with a suspected infected apparatus if a predetermined condition is satisfied.

More specifically, the request destination apparatuses may perform a virus scan of an access request itself (data constituting the access request) received from the suspected infected apparatus, and may be forbidden to establish communication connection with the suspected infected apparatus if a computer virus has been detected from the access request itself.

Figure 11:
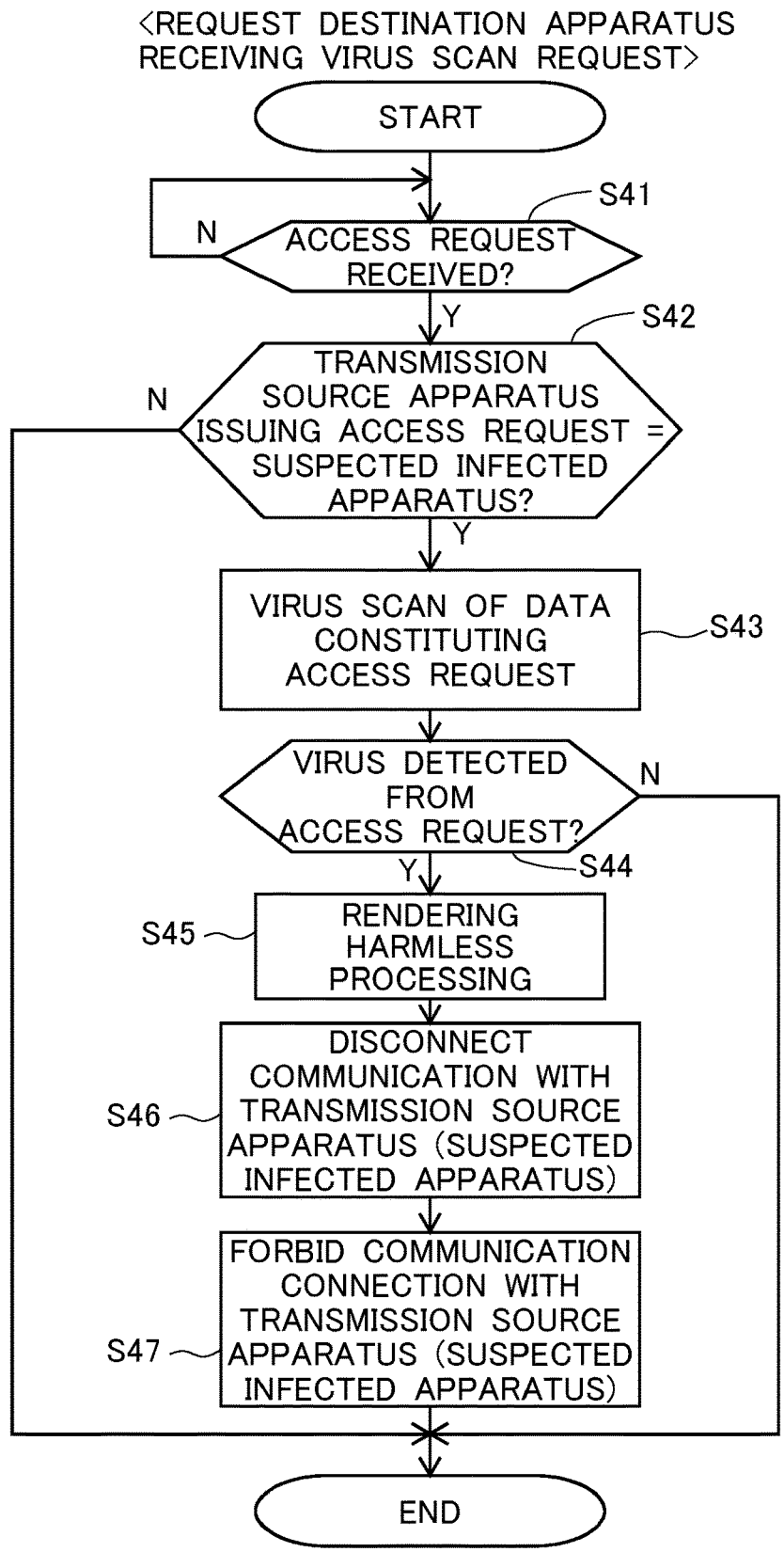
FIG. 11 is a flowchart of operations performed by the request destination apparatus when an access request is received from another MFP 10 during execution of a virus scan.

FIG. 11 is a flowchart of operations performed by a request destination apparatus (request destination apparatus receiving a virus scan request) when having received an access request from another MFP 10 during execution of a virus scan. The flowchart in FIG. 11 is performed as a separate procedure different from the flowchart in FIG. 5 (flowchart of operations performed by the request destination apparatus when having received a virus scan request).

In step S41, a request destination apparatus (e.g., MFP 10c) determines whether it has received an access request from another MFP 10 other than itself during execution of its virus scan. If the MFP 10c has received an access request from the other MFP 10 during execution of its virus scan, the procedure proceeds from step S41 to step S42. For example, if the MFP 10c has received a request to use the box storage function (request to store data in the storage 5 of the MFP 10c) from another MFP 10 during execution of its virus scan, the procedure proceeds to step S42.

In step S42, the request destination apparatus (MFP 10c) determines, on the basis of the virus infection information included in the virus scan request, whether the transmission source apparatus that has issued the access request is a suspected infected apparatus (MFP 10 included in the virus infection information; e.g., MFP 10d).

For example, if it is determined in step S42 that the transmission source apparatus having issued the access request is not a suspected infected apparatus (MFP 10d), the flowchart in FIG. 11 ends, and the request destination apparatus (MFP 10c) is not forbidden to establish communication connection with the transmission source apparatus. Then, to-be-stored data received from the transmission source apparatus is stored in the storage 5 of the MFP 10c on the basis of the request to use the box storage function from the transmission source apparatus.

On the other hand, if it is determined in step S42 that the transmission source apparatus having issued the access request is a suspected infected apparatus (MFP 10d), the procedure proceeds to step S43, in which the request destination apparatus (MFP 10c) performs a virus scan of the data constituting the access request received from the transmission source apparatus (suspected infected apparatus; in the present example, MFP 10d).

Then, it is determined in step S44 whether a computer virus has been detected by the virus scan of the data constituting the access request.

For example, if no computer viruses have been detected from the data constituting the access request, the flowchart in FIG. 11 ends, and the request destination apparatus (in the present example, MFP 10c) is not forbidden to establish communication connection with the transmission source apparatus having issued the access request (suspected infected apparatus; MFP 10d). Then, the to-be-stored data received from the MFP 10d is stored in the storage 5 of the MFP 10c on the basis of the request to use the box storage function from the transmission source apparatus having issued the access request (MFP 10d).

On the other hand, if a computer virus has been detected from the data constituting the access request, the procedure proceeds to steps S45 to S47, and the request destination apparatus (MFP 10c) is forbidden to establish communication connection with the suspected infected apparatus (MFP 10d). More specifically, the request destination apparatus (MFP 10c) performs rendering harmless processing (e.g., processing for combating the computer virus) on the computer virus detected from the data constituting the access request (step S45). Then, the request destination apparatus (MFP 10c) disconnects the communication with the transmission source apparatus having issued the access request (suspected infected apparatus; in the present example, MFP 10d) (step S46), and the MFP 10c is forbidden to establish communication connection with the MFP 10d (step S47).

In this way, the request destination apparatus may perform a virus scan of the data constituting an access request received from a suspected infected apparatus, and may be forbidden to establish communication connection with the suspected infected apparatus if a computer virus has been detected from the access request itself.

As another alternative, the request destination apparatus may be forbidden to establish communication connection with a suspected infected apparatus if the access request from the suspected infected apparatus is a request to use a suspected cause-of-infection function.

More specifically, the request source apparatus issuing a virus scan request transmits a virus scan request that includes the connection forbidding command (virus infection information) to the other MFPs 10 (request destination apparatuses) as in the third embodiment (step S15). Note that the virus infection information includes information regarding a suspected infected apparatus (e.g., MFP 10d) and information regarding a suspected cause-of-infection function (e.g., box storage function; see the fourth embodiment).

Then, each request destination apparatus performs the following operations.

Figure 12:
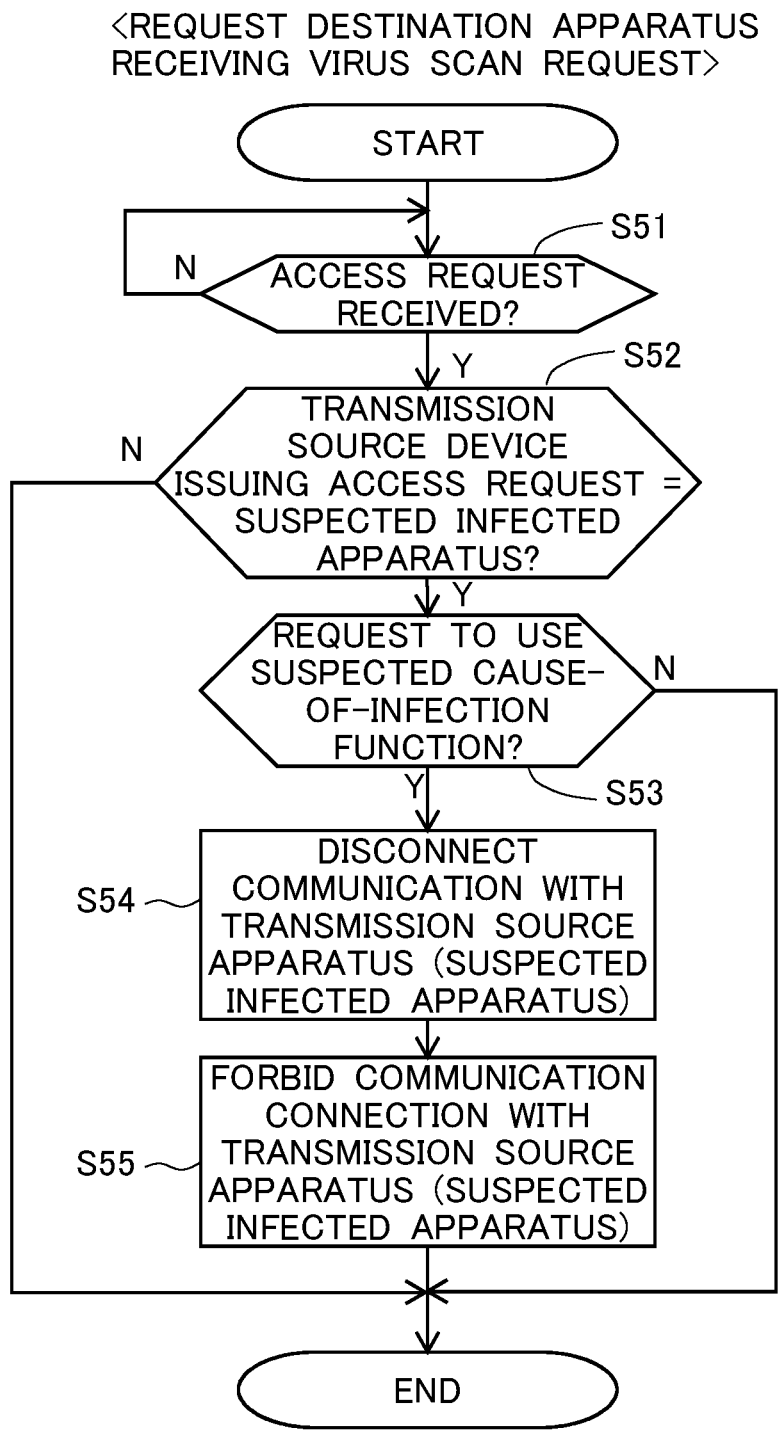
FIG. 12 is a flowchart of operations performed by the request destination apparatus when an access request is received from another MFP 10 during execution of a virus scan.

FIG. 12 is a flowchart of operations performed by each request destination apparatus (request destination apparatus receiving a virus scan request) when having received an access request from another MFP 10 during execution of its virus scan. The flowchart in FIG. 12 is performed as a separate procedure different from the flowchart in FIG. 5 (flowchart of operations performed by the request destination apparatus when having received a virus scan request).

More specifically, when having received an access request from an apparatus other than itself during execution of a virus scan based on the virus scan request (step S51), the request destination apparatus (e.g., MFP 10c) determines, on the basis of the virus infection information included in the virus scan request, whether the transmission source apparatus that has issued the access request is a suspected infected apparatus (step S52).

For example, if it is determined in step S52 that the transmission source apparatus having issued the access request is not a suspected infected apparatus (e.g., MFP 10d), the flowchart in FIG. 12 ends, and the request destination apparatus (in the present example, MFP 10c) is not forbidden to establish communication connection with the transmission source apparatus.

On the other hand, if it is determined in step S52 that the transmission source apparatus having issued the access request is a suspected infected apparatus (MFP 10d), the procedure proceeds to step S53, in which it is determined whether the access request received from the suspected infected apparatus (MFP 10d) is a request to use a suspected cause-of-infection function included in the virus infection information.

For example, if the access request from the suspected infected apparatus is a request to use the print function, it is determined in step S53 that the access request is not a request to use the suspected cause-of-infection function (in the present example, box storage function), and the flowchart in FIG. 12 ends. That is, the request destination apparatus (MFP 10c) is not forbidden to establish communication connection with the transmission source apparatus (suspected infected apparatus; in the present example, MFP 10d). In other words, even if an access request has been received from the suspected infected apparatus, the request destination apparatus is not forbidden to establish communication connection with the suspected infected apparatus if the access request is not a request to use the suspected cause-of-infection function.

On the other hand, if the access request from the suspected infected apparatus (MFP 10d) is a request to use the suspected cause-of-infection function (box storage function), the procedure proceeds to step S54, and the access request is rejected. Then, the request destination apparatus (MFP 10c) is forbidden to establish communication connection with the suspected infected apparatus (MFP 10d) (step S55).

In this way, the request destination apparatus may be forbidden to establish communication connection with the suspected infected apparatus if the access request from the suspected infected apparatus is a request to use the suspected cause-of-infection function.

Variation on Disabling Network Function

In addition to the operations described in the above embodiments, the network function of the request source apparatus issuing a virus scan request (e.g., MFP 10a) may be disabled after the request source apparatus has transmitted a virus scan request to the request destination apparatuses (step S15 in FIG. 4). Then, the MFP 10a may enable its network function again after the request source apparatus (MFP 10a) has completed antivirus processing and is confirmed to be capable of safe communication connection (step S16).

In this case, the network function of the MFP 10a is disabled until it is ensured that the MFP 10 (in the present example, MFP 10a) from which the computer virus is detected is capable of safe communication connection. This configuration further reduces the possibility that computer virus infection will expand.

In addition to the operations described in the above embodiments, the network function of a request destination apparatus may be disabled if a computer virus has been detected by a virus scan performed by the request destination apparatus.

More specifically, a request destination apparatus (e.g., MFP 10c) may disable its network function if a computer virus has been detected as a result of the virus scan performed on the basis of the virus scan request (step S22 in, for example, FIG. 5). Then, the request destination apparatus (MFP 10c) may enable its network function again after the MFP 10c has completed the antivirus processing and is confirmed to be capable of safe communication connection (step S25).

In this case, if a request destination apparatus is infected with a computer virus, the request destination apparatus disables its network function until it is ensured that the request destination apparatuses is capable of safe communication connection. This configuration further reduces the possibility that computer virus infection will expand.

Variation on Manual Execution of Virus Scan by Request Destination Apparatus

While the above embodiments describe an example in which the request destination apparatuses automatically perform a virus scan, the present invention is not limited to this example, and the request destination apparatuses may perform a virus scan in response to a user instruction to start a virus scan.

Figure 18:
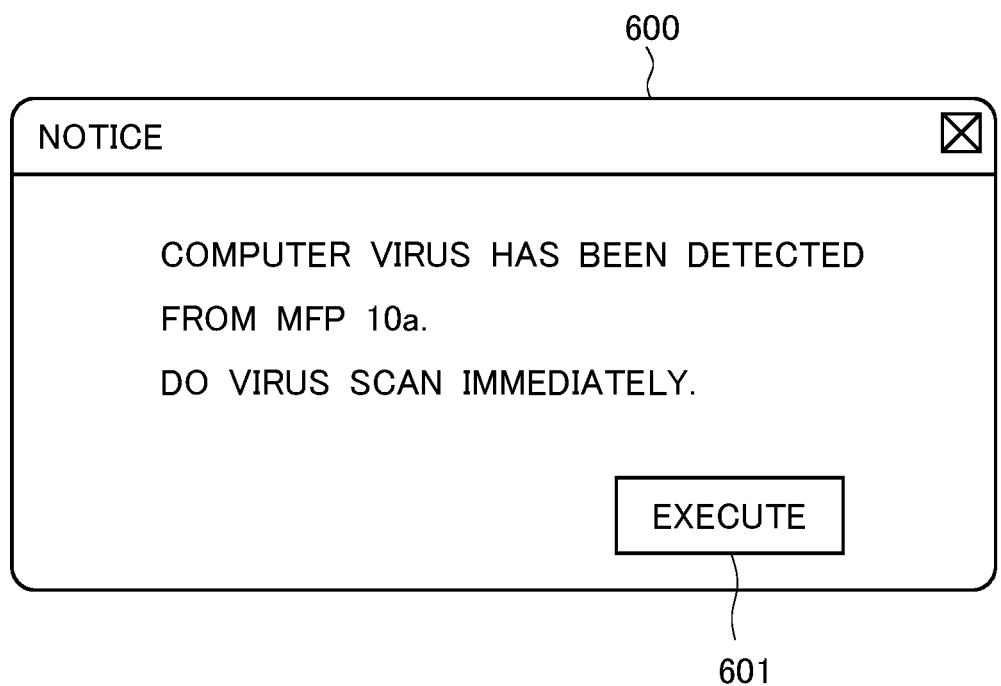
FIG. 18 illustrates a scan execution request screen.

More specifically, upon receiving a virus scan request from the request source apparatus, each request destination apparatus notifies the user (e.g., manager) of an execution request that a virus scan be performed by the request destination apparatus. To be more specific, a scan execution request screen 600 (see FIG. 18) for requesting the user to perform a virus scan is displayed on the touch panels 25 of the request destination apparatus. The scan execution request screen 600 displays a message saying that a computer virus has been detected from an MFP 10 (in the present example, MFP 10a) in the information processing system 1 and a message saying that the request destination apparatus needs to perform a virus scan. The scan execution request screen 600 also displays an execution start button 601 for instructing the start of a virus scan.

The user (e.g., manager) performs, for example, settings relating to a virus scan (e.g., settings such as increasing the number of directories to be scanned) and thereafter presses the execution start button 601 to give an instruction to start a virus scan. When the user has given an instruction to start a virus scan in response to the execution request, the request destination apparatus performs a virus scan.

In this way, the request destination apparatuses may perform a virus scan in response to the user issuing an instruction to start a virus scan.

Variations on Transmission Destination Receiving Virus Scan Request

While the above embodiments describe an example in which the request source apparatus issuing a virus scan request (e.g., MFP 10a) transmits a virus scan request to each of a plurality of MFPs 10 (e.g., 10b, 10c, 10d, and so on) (step S15 in FIG. 4), the present invention is not limited to this example.

Figure 19:
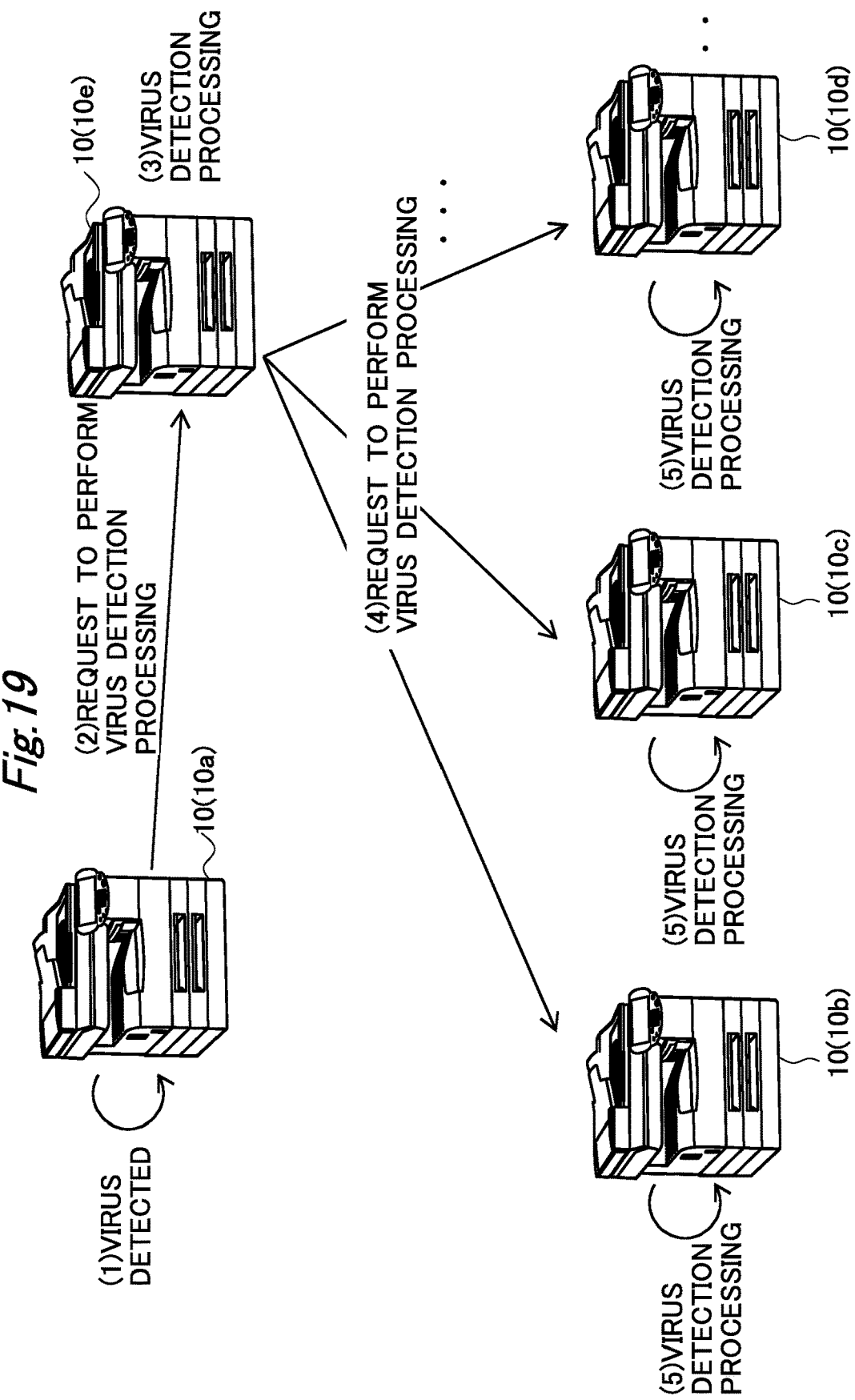
FIG. 19 is a conceptual diagram for describing an outline of operations performed in the information processing system according to a variation.

For example, the request source apparatus (e.g., MFP 10a) may transmit a virus scan request to only a specific MFP 10 (e.g., MFP 10e) among the plurality of MFPs 10 as illustrated in FIG. 19. Then, the specific MFP 10 (MFP 10e) may transmit (transfer) the virus scan request received from the MFP 10a to the remaining MFPs 10 excluding the request source apparatus (MFP 10a) and itself (MFP 10e).

More specifically, when a computer virus has been detected from an MFP 10 (e.g., MFP 10a) (step S12 in FIG. 4), the MFP 10a transmits a virus scan request to a specific MFP 10 (e.g., MFP 10e) after steps S13 and S14 (step S15). For example, when the information processing system 1 is an ubiquitous system that includes no server devices, the MFP 10a transmits a virus scan request to an MFP 10 (e.g., MFP 10e) that functions as a server device.

Then, upon receiving the virus scan request from the request source apparatus (MFP 10a), the MFP 10e performs a virus scan and transfers the virus scan request to the other MFPs 10 (10b, 10c, 10d, 10f, and so on). In other words, the MFP 10e not only operates as a request destination apparatus receiving a virus scan request and performs a virus scan, but also transfers the virus scan request to the other MFPs 10 (10b, 10c, 10d, 10f, and so on). Thereafter, the MFPs 10 such as MFPs 10b, 10c, 10d, and 10f that have received the virus scan request perform a virus scan on the basis of the virus scan request.

In this way, the request source apparatus issuing a virus scan request may transmit a virus scan request to only a specific MFP 10.

Figure 20:
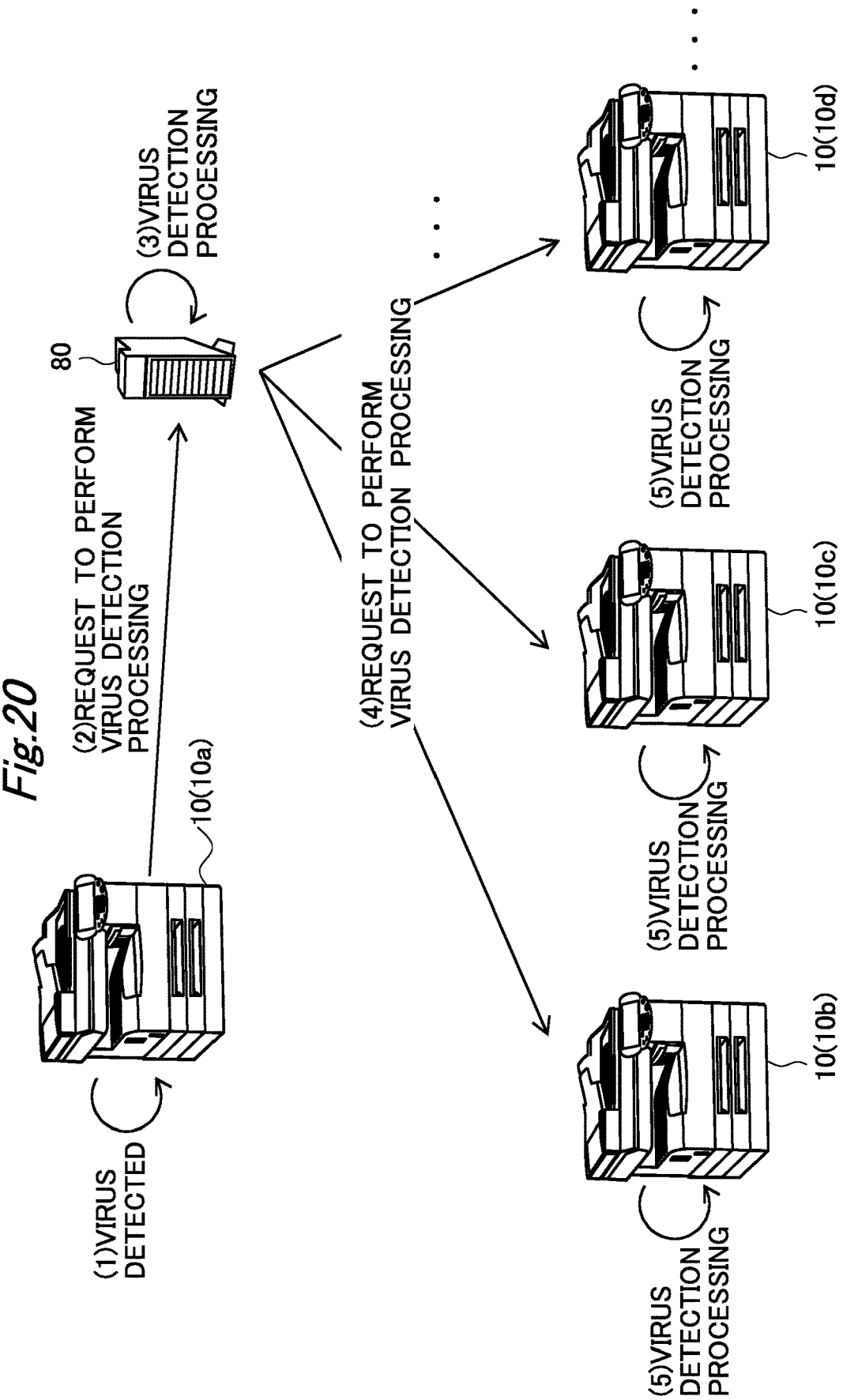
FIG. 20 is a conceptual diagram for describing an outline of operations performed in the information processing system according to another variation.

As another alternative, the request source apparatus issuing a virus scan request (MFP 10a) may transmit a virus scan request to only a server device 80 (step S15) as illustrated in FIG. 20. Then, the server device 80 may transmit (transfer) the virus scan request received from the request source apparatus (MFP 10a) to the remaining MFPs 10 excluding the request source apparatus (MFP 10a) among the plurality of MFPs 10.

More specifically, if a computer virus has been detected from the MFP 10a (step S12), the MFP 10a transmits a virus scan request to the server device 80 after steps S13 and S14 (step S15).

Upon receiving the virus scan request from the request source apparatus (MFP 10a), the server device 80 performs a virus scan and transfers the virus scan request to the MFPs 10 (10b, 10c, 10d, and so on) other than the MFP 10a. In other words, the server device 80 not only operates as a request destination apparatus receiving the virus scan request and performs a virus scan, but also transfers the virus scan request to the MFPs 10 (10b, 10c, 10d, and so on) other than the request source apparatus. Thereafter, the MFPs such as MFPs 10b, 10c, and 10d that have received the virus scan request perform a virus scan on the basis of the virus scan request.

In this way, the request source apparatus issuing a virus scan request (in the present example, MFP 10a) may transmit a virus scan request to only a specific apparatus (i.e., the specific MFP 10 or the server device 80).

While in the present example, the virus scan request is transmitted and received via a specific apparatus (e.g., the specific MFP 10 or the server device 80), the present invention is not limited to this example. For example, in the sixth embodiment, the processing result of antivirus processing may be transmitted or received via the specific apparatus.

OTHER VARIATIONS

While the above embodiments describe an example in which the information processing system 1 is configured by only MFPs 10 (or by MFPs 10 and the server device 80), the present invention is not limited to this example, and the information processing system 1 may also include personal computers as its constituent elements. Alternatively, the information processing system 1 may be configured by only personal computers.

Although embodiments of the present invention have been described and illustrated in detail, it is clearly understood that the same is by way of illustration and example only and not limitation, the scope of the present invention should be interpreted by terms of the appended claims.

What is claimed is:
1. An information processing system comprising:
a plurality of image forming apparatuses,
one image forming apparatus among the plurality of image forming apparatuses including:
a first hardware processor; and
a first transmitter,
wherein:

the first hardware processor causes the one image forming apparatus to perform virus detection processing for detecting a computer virus, and in response to a computer virus being detected by the one image forming apparatus performing the virus detection processing, the first hardware processor causes the first transmitter to transmit an execution request to perform the virus detection processing to another image forming apparatus different from the one image forming apparatus among the plurality of image forming apparatuses.

2. The information processing system according to claim 1, wherein one request destination apparatus that is one of the plurality of image forming apparatuses and that receives the execution request includes:

a receiver that receives the execution request; and a second hardware processor that causes the one request destination apparatus to automatically perform the virus detection processing based on the execution request.

3. The information processing system according to claim 2, wherein the second hardware processor causes the one request destination apparatus to automatically perform the virus detection processing in response to receipt of the execution request.

4. The information processing system according to claim 2, wherein:

the execution request includes time designation information that designates a start time of the virus detection processing to be performed by the one request destination apparatus, and the second hardware processor causes the one request destination apparatus to automatically perform the virus detection processing in response to arrival of the time designated by the time designation information after receipt of the execution request.

5. The information processing system according to claim 4, wherein the time designation information designates the start time of the virus detection processing to be performed by the one request destination apparatus in accordance with a predetermined order of priority of the plurality of image forming apparatuses.

6. The information processing system according to claim 2, wherein the second hardware processor performs the virus detection processing on data constituting the execution request when the execution request is received.

7. The information processing system according to claim 2, wherein:

the execution request includes virus infection information, the virus infection information includes information regarding a suspected infected apparatus that has established communication connection with the one image forming apparatus within a presumed infection period and that is suspected of being infected with the computer virus, the presumed infection period being a period during which the one image forming apparatus is presumed to have become infected with the computer virus, the presumed infection period is a period from when the one image forming apparatus has been confirmed to be capable of safe communication connection by previous virus detection processing performed by the one image forming apparatus until the computer virus has been detected by the one image forming apparatus, and the second hardware processor forbids the one request destination apparatus to establish communication connection with the suspected infected apparatus based on the virus infection information.

8. The information processing system according to claim 7, wherein:

when an access request is received from the suspected infected apparatus, the second hardware processor performs the virus detection processing on data constituting the access request, and when a computer virus has been detected from the data constituting the access request, the second hardware processor disconnects communication connection between the one request destination apparatus and the suspected infected apparatus and forbids the one request destination apparatus to establish communication connection with the suspected infected apparatus.

9. The information processing system according to claim 7, wherein:

the virus infection information further includes information regarding a suspected cause-of-infection function that has been used by the one image forming apparatus within the presumed infection period and that is suspected of being a cause of infection with the computer virus, and when a use request to use the suspected cause-of-infection function is received from the suspected infected apparatus, the second hardware processor rejects the use request and forbids the one request destination apparatus to establish communication connection with the suspected infected apparatus.

10. The information processing system according to claim 2, wherein:

the execution request includes virus infection information, the virus infection information includes information regarding a suspected cause-of-infection function that has been used by the one image forming apparatus within a presumed infection period and that is suspected of being a cause of infection with the computer virus, the presumed infection period being a period during which the one image forming apparatus is presumed to have become infected with the computer virus, the presumed infection period is a period from when the one image forming apparatus has been confirmed to be capable of safe communication connection by previous virus detection processing performed by the one image forming apparatus until the computer virus has been detected by the one image forming apparatus, and the second hardware processor forbids the one request destination apparatus to use the suspected cause-of-infection function based on the virus infection information.

11. The information processing system according to claim 2, wherein:

the one request destination apparatus is one of a plurality of request destination apparatuses that receive the execution request, the one request destination apparatus further includes a second transmitter, and when no computer viruses have been detected by the virus detection processing performed by the one request destination apparatus, the second hardware processor of the one request destination apparatus causes the second transmitter to transmit a security check report to remaining request destination apparatuses of the plurality of request destination apparatuses excluding the one request destination apparatus, the security check report being a report indicating that the one request destination apparatus is confirmed to be capable of safe communication connection.

12. The information processing system according to claim 11, wherein:
the second hardware processor of the one request destination apparatus causes the receiver of the one request destination apparatus to receive the security check report from at least one apparatus of the plurality of image forming apparatuses other than the one request destination apparatus, and
the second hardware processor causes a display of the one request destination apparatus to display a display content that is based on the security check report received from the at least one apparatus.

13. The information processing system according to claim 11, wherein:
the second hardware processor of the one request destination apparatus causes the receiver of the one request destination apparatus to receive the security check report from at least one apparatus of the plurality of image forming apparatuses other than the one request destination apparatus,
when an access request is received from another image forming apparatus different from the one request destination apparatus while the one request destination apparatus has not yet completed the virus detection processing, the second hardware processor identifies an alternate image forming apparatus from among the plurality of image forming apparatuses based on the security check report, the alternate image forming apparatus being an image forming apparatus that is confirmed to be capable of safe communication connection and that serves as a substrate for the one request destination apparatus to establish communication connection with a transmission source apparatus that has issued the access request, and
the second hardware processor causes the second transmitter of the one request destination apparatus to transmit information regarding the alternate image forming apparatus that has been identified and information regarding the transmission source apparatus that has issued the access request.

14. The information processing system according to claim 2, wherein:
the one request destination apparatus is one of a plurality of request destination apparatuses that receive the execution request,
the one request destination apparatus further includes a second transmitter,
when a computer virus has been detected by the virus detection processing performed by the one request destination apparatus, the second hardware processor of the one request destination apparatus performs rendering harmless processing for rendering harmless the computer virus that has been detected, and
when a computer virus has been detected by the virus detection processing performed by the one request destination apparatus, the second hardware processor causes the second transmitter to transmit a security check report to remaining request destination apparatuses of the plurality of request destination apparatuses excluding the one request destination apparatus, on condition that the rendering harmless processing has been performed on the computer virus that has been detected, the security check report being a report indicating that the one request destination apparatus is confirmed to be capable of safe communication connection.

15. The information processing system according to claim 2, wherein:
when the computer virus has been detected by the virus detection processing performed by the one image forming apparatus, the first hardware processor of the one image forming apparatus performs rendering harmless processing for rendering harmless the computer virus that has been detected; and
when the computer virus has been detected by the virus detection processing performed by the one image forming apparatus, the first hardware processor causes the first transmitter to transmit a security check report to the one request destination apparatus, on condition that the rendering harmless processing has been performed on the computer virus that has been detected, the security check report being a report indicating that the one image forming apparatus is confirmed to be capable of safe communication connection.

16. The information processing system according to claim 2, wherein:
the second hardware processor of the one request destination apparatus causes the receiver to receive a processing result from at least one apparatus of the plurality of image forming apparatuses other than the one request destination apparatus, the processing result being a processing result of the virus detection processing performed by the at least one apparatus, and
the second hardware processor causes a display of the one request destination apparatus to display the processing result received from the at least one apparatus.

17. The information processing system according to claim 2, wherein:
when a computer virus has been detected by the virus detection processing performed based on the execution request by the one request destination apparatus, the second hardware processor disables a network communication function of the one request destination apparatus, and
the second hardware processor enables the network communication function of the one request destination apparatus again after the one request destination apparatus has completed the virus detection processing and is confirmed to be capable of safe communication connection.

18. The information processing system according to claim 1, wherein one request destination apparatus that is one of the plurality of image forming apparatuses and that receives the execution request includes:
a receiver that receives the execution request; and
a second hardware processor that, when the execution request is received, notifies a user of an execution commission to cause the one request destination apparatus to perform the virus detection processing, and causes the one request destination apparatus to perform the virus detection processing in response to the user giving an instruction to start the virus detection processing in accordance with the execution commission.

19. The information processing system according to claim 1, wherein:
the first hardware processor disables a network communication function of the one image forming apparatus after transmission of the execution request, and
the first hardware processor enables the network communication function of the one image forming apparatus again after the one image forming apparatus has completed the virus detection processing and is confirmed to be capable of safe communication connection.

20. The information processing system according to claim 1, wherein, in response to the computer virus being detected by the one image forming apparatus, the first hardware processor causes the first transmitter to transmit the execution request to each of the plurality of image forming apparatuses.

21. The information processing system according to claim 1, wherein:
   in response to the computer virus being detected by the one image forming apparatus, the first hardware processor causes the first transmitter to transmit the execution request to a specific image forming apparatus among the plurality of image forming apparatuses, and
   in response to having received the execution request from the one image forming apparatus, the specific image forming apparatus transfers the execution request to remaining image forming apparatuses of the plurality of image forming apparatuses, excluding the one image forming apparatus and the specific image forming apparatus.

22. An image forming apparatus that is one constituent element of an information processing system configured by a plurality of image forming apparatuses, the image forming apparatus comprising:
   a hardware processor; and
   a transmitter,
   wherein:
   the hardware processor causes the image forming apparatus to perform virus detection processing for detecting a computer virus, and
   in response to a computer virus being detected by the image forming apparatus performing the virus detection processing, the hardware processor causes the transmitter to transmit an execution request to perform the virus detection processing to another image forming apparatus different from the image forming apparatus among the plurality of image forming apparatuses.

23. A non-transitory computer-readable recording medium that records a program for causing a computer built into one image forming apparatus that is one constituent element of an information processing system configured by a plurality of image forming apparatuses to perform processes comprising:
   causing the one image forming apparatus to perform virus detection processing for detecting a computer virus; and
   in response to a computer virus being detected by the one image forming apparatus performing the virus detection processing, transmitting an execution request to perform the virus detection processing to another image forming apparatus different from the one image forming apparatus among the plurality of image forming apparatuses.

24. The recording medium according to claim 23, wherein:
   the execution request includes virus infection information,
   the virus infection information includes information regarding a suspected infected apparatus that has established communication connection with the one image forming apparatus within a presumed infection period and that is suspected of being infected with the computer virus, the presumed infection period being a period during which the one image forming apparatus is presumed to have become infected with the computer virus,
   the presumed infection period is a period from when the one image forming apparatus has been confirmed to be capable of safe communication connection by previous virus detection processing performed by the one image forming apparatus until the computer virus has been detected by the one image forming apparatus, and
   in the transmitting the execution request, control is performed to forbid a request destination apparatus to establish communication connection with the suspected infected apparatus, the request destination apparatus being an apparatus that is one of the plurality of image forming apparatuses and that receives the execution request.

* * * * *